US011662951B2

(12) United States Patent
Ki et al.

(10) Patent No.: US 11,662,951 B2
(45) **Date of Patent: *May 30, 2023**

(54) ENHANCED SSD RELIABILITY

(71) Applicant: Samsung Electronics Co., Ltd., Suwon-si (KR)

(72) Inventors: Yang Seok Ki, Palo Alto, CA (US); Rekha Pitchumani, Oak Hill, VA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/701,664

(22) Filed: Mar. 22, 2022

(65) Prior Publication Data

US 2022/0214836 A1 Jul. 7, 2022

Related U.S. Application Data

(63) Continuation of application No. 16/853,731, filed on Apr. 20, 2020, now Pat. No. 11,307,804.

(60) Provisional application No. 62/948,792, filed on Dec. 16, 2019.

(51) Int. Cl.
*G06F 3/06* (2006.01)
*G06F 11/10* (2006.01)

(52) U.S. Cl.
CPC .......... *G06F 3/0659* (2013.01); *G06F 3/0619* (2013.01); *G06F 3/0673* (2013.01); *G06F 11/1068* (2013.01)

(58) Field of Classification Search
CPC .. G06F 3/0659; G06F 3/0673; G06F 11/1068; G06F 3/0619
See application file for complete search history.

(56) References Cited

U.S. PATENT DOCUMENTS

| | | | |
|---|---|---|---|
| 8,533,558 B2 | 9/2013 | Yurzola et al. | |
| 8,631,306 B2 | 1/2014 | Lee et al. | |
| 8,719,665 B2 | 5/2014 | Roohparvar et al. | |
| 8,892,980 B2 | 11/2014 | Fillingim | |
| 9,032,245 B2 | 5/2015 | Roh | |
| 9,317,362 B2 | 4/2016 | Khan | |
| 10,496,480 B2 * | 12/2019 | Gajjar | G06F 21/6218 |
| 11,307,804 B2 * | 4/2022 | Ki | G06F 3/0659 |
| 2010/0100664 A1 | 4/2010 | Shimozono | |
| 2011/0314354 A1 | 12/2011 | Fillingim | |
| 2014/0053033 A1 | 2/2014 | Roohparvar et al. | |
| 2019/0164599 A1 | 5/2019 | Avraham et al. | |

OTHER PUBLICATIONS

Notice of Allowance for U.S. Appl. No. 16/853,731, dated Dec. 6, 2021.
Office Action for U.S. Appl. No. 16/853,731, dated Jul. 9, 2021.

* cited by examiner

*Primary Examiner* — Guy J Lamarre
(74) *Attorney, Agent, or Firm* — Renaissance IP Law Group LLP

(57) ABSTRACT

A Solid State Drive (SSD) is disclosed. The SSD may include an interface to receive read and write requests from an application on a host. Storage, including at least one chip, may store data. An SSD controller may process the read and write requests from the application. A configuration module may configure the SSD. Storage may include a reliability table which may include entries specifying configurations of the SSD and reliabilities for those configurations.

23 Claims, 13 Drawing Sheets

| Storage Scheme | ECC Scheme | Erasure Coding Scheme | Reliability | Space Overhead | Performance | Identifier |
| --- | --- | --- | --- | --- | --- | --- |
| Storage 1 | ECC 1 | EC 1 | $10^{-12}$ | 0 | 0 | 1 |
| Storage 2 | ECC 1 | EC 1 | $10^{-14}$ | 50% | 0 | 2 |
| ... | | | | | | |
| Storage 1 | ECC 2 | EC 1 | $10^{-16}$ | 0 | 25% | 3 |
| Storage 2 | ECC 2 | EC 1 | $10^{-18}$ | 50% | 25% | 4 |
| ... | | | | | | |
| Storage 1 | ECC 1 | EC 2 | $10^{-14}$ | 0 | 10% | 5 |
| Storage 2 | ECC 1 | EC 2 | $10^{-17}$ | 50% | 10% | 6 |
| ... | | | | | | |

ENHANCED SSD RELIABILITY

RELATED APPLICATION DATA

This application is a continuation of U.S. patent application Ser. No. 16/853,731, filed Apr. 20, 2020, which claims the benefit of U.S. Provisional Patent Application Ser. No. 62/948,792, filed Dec. 16, 2019, both of which are incorporated by reference herein for all purposes.

FIELD

The inventive concepts relate generally to storage systems, and more particularly to storage systems that storage systems offering variable levels of reliability.

BACKGROUND

Ideally, storage devices, such as Solid State Drives (SSDs), would be perfect: every bit written could be read without error. But the real world is not perfect: errors occur occasionally, despite the best efforts of SSD manufacturers.

To aid consumers, manufacturers may provide estimates of the reliability of a device. For example, a manufacturer might report a reliability of 99.99% (or its equivalent, an average error rate of 1 bit per 1000 bits written and/or read). (In reality, this reliability is relatively low: it would imply at least one error in almost every page written to the SSD. But this reliability level works as an example.)

But this reliability relates to the number of bits written to the SSD or read from the SSD. This reliability may not accurately reflect the reliability of the data from the point of the application. There are other functions performed by the SSD that may impact its true reliability.

A need remains to more accurately determine the reliability of storage systems and to control the reliability of storage systems.

DETAILED DESCRIPTION

Figure 1:
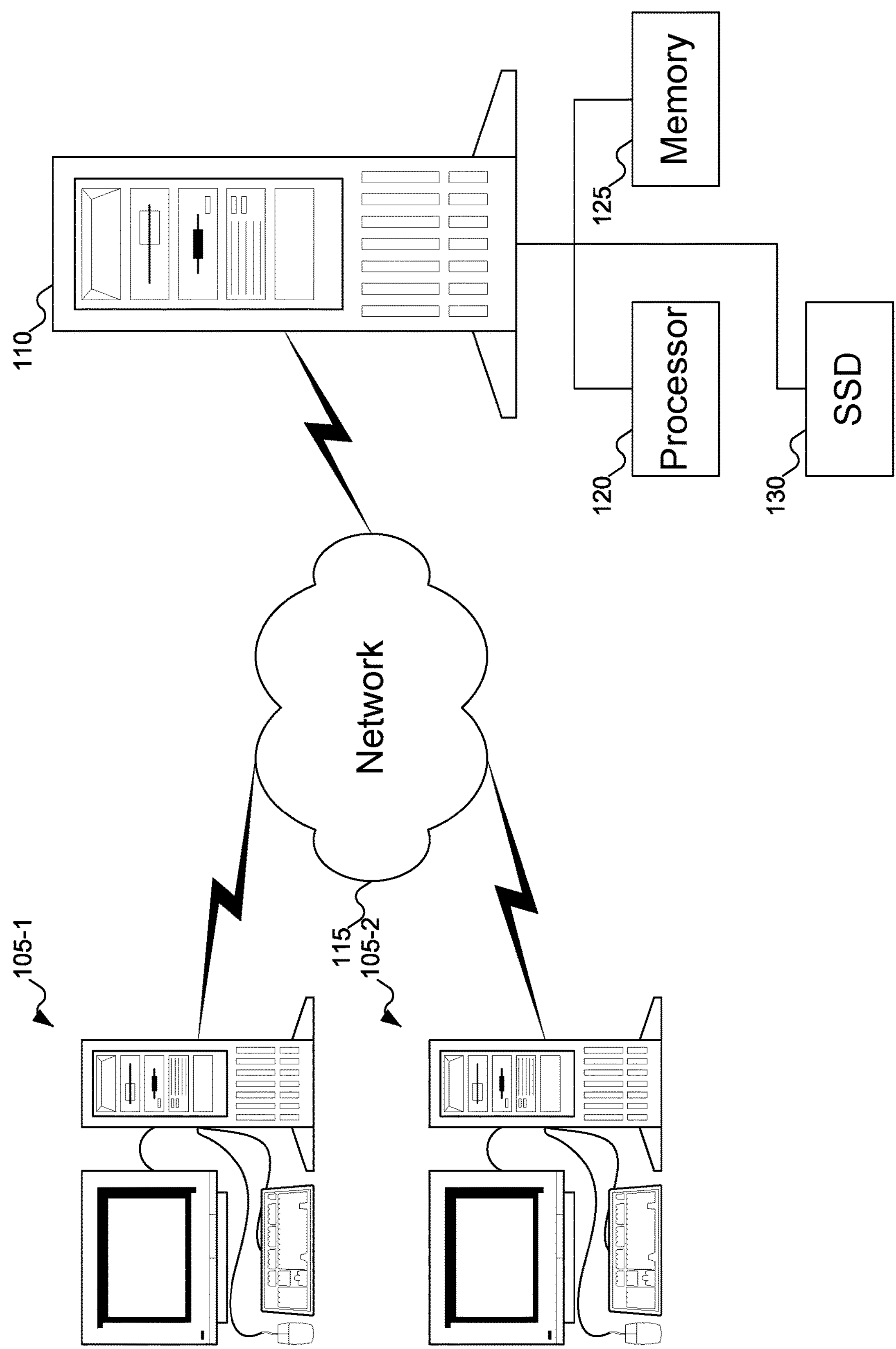
FIG. 1 shows a system including a clients and a server, the server including a Solid State Drive (SSD), according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms “a”, “an”, and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As an example of how the reliability listed by the manufacturer may not accurately reflect the true reliability of a storage device, consider data compression. If a Solid State Drive (SSD) compresses the data before writing the data, then a single bit error in the compressed data may actually affect multiple bits in the raw data. For example, if the data is compressed with an effective ratio of 2:1 (that is, the size of the data written is ½ the size of the raw data), then a single bit error may be expected to affect two bits in the raw data, effectively double the average error rate. Or in a worst case scenario, the error may prevent the SSD from being able to successfully decompress the raw data, rendering the entirety of the raw data lost.

Or consider data deduplication. In data deduplication, the SSD attempts to improve the storage efficiency by identifying chunks of data that are the same across multiple files (or even entire files that are stored identically multiple times). Instead of storing multiple copies of the data, the SSD may store only one copy and reference that copy from the various files that include that chunk of data. But if there is an error in the data that would have been duplicated, that error becomes an error in every file that uses that data, again magnifying the error rate. For example, if the same data is used in three different files, then a single error in the duplicated data is effectively three errors in three different files.

In addition, different applications may each have different reliability requirements. For example, one application may want there to be no more than 1 error in 1 MB written by the application, whereas another application might want there to be no more than 1 error in 1 GB of data written by the application. While applications may specify such reliability rates to help select from among different storage devices available, there is currently no way for a single storage device to support multiple different reliability levels.

Depending on the implementation, SSDs may include multiple levels at which reliability may be managed. These may include the memory chips themselves (where the data is actually stored), which may be flash memory chips such as NAND flash memory chips, Non-Volatile Memory chips, or other types of memory chips, using an Error Correcting Code (ECC) module (which may detect and/or correct for errors read from the memory chips), and in a RAID/Erasure Coding implementation (where data may be stored across multiple memory chips via multiple channels to provide for some redundancy).

There are various ways to provide for error detection and correction using a Redundant Array of Independent Disks (RAID) or with Erasure Coding. For example, RAID 1, RAID 5, RAID 6, or alternative erasure coding implementations may support error correction. Each implementation offers varying degrees of reliability.

ECC modules may also be used, and may implement any desired ECC algorithms. Example algorithms that may provide for error detection and/or correction include a basic parity check, Cyclic Redundancy Check (CRC), Hamming Codes, and the like are all well-known schemes for performing error detection and/or correction. Each implementation offers varying degrees of reliability.

Finally, NAND flash memory chips may also offer some options with regard to reliability. For example, consider a Single-Level Cell (SLC). An SLC may store one bit of data. By applying an appropriate voltage to the cell, the SSD may read the bit (that is, applying one voltage to the cell the cell may be determined to store the value “0”, whereas by applying a different voltage to the cell the cell may be determined to store the value “1”). Multi-Level Cells (MLCs) store two bits of data, thereby requiring up to four different voltage levels to determine the value stored in the cell; Triple-Level Cells (TLCs) store up to three bits of data, thereby requiring up to eight different voltage levels to determine the value stored in the cell; and Quad-Level Cells (QLCs) store up to four bits, requiring up to 16 different voltage levels to determine the value stored in the cell.

As the number of bits stored in the cell increases, the width of the voltage ranges that separate different possible stored values becomes smaller. Thus, it is more likely that a QLC will return an error due to an error from processing the applied voltage than an SLC will return such an error (the same is true for MLCs and TLCs). In addition, cells tends to support fewer writes as the number of bits they store increases. Thus, an SLC may support up to 100,000 data writes, whereas a QLC may support up to only 100 data writes (after which errors are more likely to occur in writing the data). (In addition, because the number of voltages that must be applied to the cell to determine its value increases with the number of bits stored in the cell, it may take longer to read data from a cell from a QLC than from an SLC).

Since there is a relationship between the number of bits stored in a cell and the likelihood of an error due to incorrect processing of the input voltage, it is reasonable to conclude that QLCs are more likely to experience such an error than the other cell types (or alternatively, that QLCs are the least reliable cell type), with SLCs being the least likely to experience such an error (or the more reliable). Of course, unless the NAND flash memory chip offers cells of both types it is not possible to store data a desired cell type to achieve a particular reliability. But it is possible to use a cell to store fewer bits than it is capable of storing, thereby increasing its reliability.

Consider the QLC type. If the QLC stores 4 bits of data its reliability is as advertised. But if the QLC stores, say, only one bit (leaving the other three bits with default values or “don’t care” values), then the QLC is effectively emulating an SLC. Errors that might be introduced due to voltage processing errors that distinguish among values of the “don’t care” bits become irrelevant: there are effectively only two input voltages that need to be applied to determine the value in the cell. (Embodiments of the inventive concept are not suggesting that the QLC might be implemented to potentially store and read only one bit, but that information returned relating to the “don’t care” bits may be ignored, along with any errors that might relate to that information. Embodiments of the inventive concept are also not suggesting that storing only one bit at a time in a QLC might result in the QLC supporting an increased number of write operations.) Thus, if the QLC were only storing one bit, the error rate may be reduced, enhancing reliability. The same would be true of any cell type that is used to store fewer bits than it is designed: thus, the QLC may emulate a TLC, MLC, or an SLC, a TLC may emulate a MLC or an SLC, and a MLC may emulate an SLC, all with an increase in their reliability. (Note that it is not possible to do the reverse: no cell type may store more than the specified number of bits of information, even at a reduction in its reliability.)

It is possible to take a QLC and empirically test it to determine how reliable it is when storing fewer than four bits: the same is true for TLCs and MLCs. This testing would be no different than how QLCs (or other cell types) are tested to determine their normal reliability, except for the amount of data being written to the QLC. Thus, it is possible to determine, for each cell type, a reliability when storing any number of bits, even when fewer than the maximum number supported by the cell.

With RAID/Erasure Coding and ECC modules, there are mathematical models that may estimate their reliability, or reliability may be empirically determined by actual use (much like how the reliability of individual cell types may be determined).

It is true that the error correction schemes at the various levels of the SSD are not entirely independent of each other. That is, if the error rate of a RAID implementation and an ECC module were $10^{-10}$, and using a QLC to store only one bit had an error rate $10^{-10}$, using all three in combination would not produce an error rate of $10^{-30}$ (the product of the individual error rates). But the solutions at the various levels are at least partially complimentary: using a combination of error correction schemes at more than one level of the SSD may offer a reliability rate that exceeds what may be provided by any individual level in isolation.

At the time of manufacture of SSD devices, it is possible to test the reliability of each combination of error correction at the various levels, and determine the overall reliability of any individual combination. Thus, for example, if the NAND flash memory included QLCs, there would be four possible variations (using the QLC to store four bits, three bits, two bits, or one bit), if the ECC offered three different error correction schemes, and the RAID/Erasure Coding implementation offered 10 different error correction variations, there would be a total of 120 different combinations ($4\times3\times10=120$). The manufacturer may test each such combination and determine each combination’s individual reliability. This information may then be stored in storage within the SSD: for example, within a configuration module.

The configuration module may also be responsible for selecting the appropriate combination of error correction at the various levels to achieve a desired reliability.

In some embodiments of the inventive concept, the applications may specify the reliability to be applied to their data. For example, some applications may require the data to be highly reliable, whereas other applications may not care as much if the data is lost (such as for temporary data or data that is easily reconstructed if lost). Given the application's specified reliability, the configuration module may configure the SSD to achieve that target reliability for the application's data using the reliability rates for the various error correcting combinations. Note that if multiple applications are writing data to the same SSD, the configuration module may configure the entire SSD to operate at the highest reliability required by any of the applications, or the configuration module may configure different areas of the SSD to operate at different reliability levels. For example, without changing the RAID or ECC implementation, the SSD may store only one bit in QLCs for data requiring a higher reliability and may store four bits in QLCs for data that tolerates a lower reliability. Note that embodiments of the inventive concept may support managing reliability at any desired unit of data: page, block, plane, die, chip, or over the entire SSD.

In other embodiments of the inventive concept, the applications may simply provide the data, without also providing a reliability requirement for the data. In such embodiments of the inventive concept, and more particularly in embodiments of the inventive concept where the SSD may use compression, data deduplication, or any other transactions that may have an impact of reliability, the SSD may track what the effective reliability is for any particular unit of data. Thus, if the application's raw data is being compressed, the SSD may track the effective compression ratio of the data, which may be used to determine a multiplier for the error rate. Or, if the SSD uses data deduplication, the SSD may track how many files are sharing a particular unit of data, which (again) may be used to determine a multiplier for the error rate. Then, to ensure an advertised reliability is achieved, the configuration module may use this information, in combination with the reliability rates for the various error correcting combinations, to select an appropriate combination that provides the advertised reliability (factoring in how errors are multiplied based on the SSD' s operations).

Note that reliability is not the only variable to consider in selecting an error correcting combination to achieve a target reliability (although it may be the primary variable). If reliability alone were the only consideration, then the SSD could simply be configured to use the error correcting combination that offered the highest reliability and be done with it: no higher reliability could be achieved. But the various error correcting combinations also have other implications. These other implications include space overhead and performance. For example, if a QLC is used to store only one bit of information, the QLC is operating at a higher reliability, but is only ¼ as efficient in terms of storage (since the QLC could store as many as four bits). Performance is also a consideration: Different error correcting combinations may require more time to process the data, which may affect the latency of the SSD.

Thus, factoring in other considerations, the configuration module may select which error correcting combination to use to configure the SSD that offers at the target reliability rate. For example, if space overhead is considered an important factor, an error correcting combination that lets the QLC store four bits of data (relying more on the ECC module or the RAID/Erasure coding) may be preferred over an error correcting combination that stores only one bit in the QLC. Alternatively, if performance is a bigger issue than space overhead, an error correcting combination that relies less on the ECC module and/or the RAID/Erasure Coding to correct for the data may be favored, even if it means that the QLC stores only one bit of data.

FIG. 1 shows a system including a clients and a server, the server including a Solid State Drive (SSD), according to an embodiment of the inventive concept. In FIG. 1, clients 105-1 and 105-2 are shown communicating with server 110 over network 115. Clients 105-1 and 105-2 and server 110 may be in a client-server relationship: clients 105-1 and 105-2 may issue commands and sever 110 may execute those commands. Alternatively, server 110 may be a computer being used directly by an end user, avoiding the involvement of clients 105-1 and 105-2.

Network 115 may be any variety or varieties of network. For example, network 115 may include a Local Area Network (LAN), a Wide Area Network (WAN), a Metropolitan Area Network (MAN), or a global network such as the Internet, among other possibilities. Data may be sent across network 115 directly, or it may be protected: for example, using encryption or a Virtual Private Network (VPN). Network 115 may include wired or wireless connections. In addition, network 115 may include any desired combinations of these alternatives. For example, clients 105-1 and 105-2 might be connected via a wireless connection to a LAN that in turn connects via a wired connection to the Internet, which in turn connects to another LAN to which server 110 is connected. The connections between clients 105-1 and 105-2 and server 110, may vary: the connections do not have to be the same in all situations.

Server 110 may include processor 120, memory 125, and Solid State Drive (SSD) 130. Processor 120 may include a software stack, including the operating system, applications, storage software (such as a file system), and controller software to manage devices attached to server 110 (such as memory 120 and SSD 130). Processor 120 may be any variety of processor: for example, an Intel Xeon, Celeron, Itanium, or Atom processor, an AMD Opteron processor, an ARM processor, etc. While FIG. 1 shows a single processor 120, server 110 may include any number of processors, each of which may be single core or multi-core processors, and may be mixed in any desired combination.

Memory 120 may be conventional memory used in server 110. Memory 120 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 120 may be a volatile memory or a non-volatile memory. Memory 120 may also be any desired combination of different memory types. Memory 120 may be managed by a memory controller (not shown in FIG. 1), which may be a separate component in server 110 with a driver that is part of the software stack. Memory 120 may be used to store data that may be termed "short-term": that is, data not expected to be stored for extended periods of time. Examples of short-term data may include temporary files, data being used locally by applications (which may have been copied from other storage locations), and the like.

Processor 120 and memory 120 may also support an operating system under which various applications may be running. These applications may issue requests to read data from or write data to either memory 120 or SSD 130.

Whereas memory 120 may be used to store data that may be termed "short-term", SSD 130 may be a storage devices used to store data that is considered "long-term": that is, data expected to be stored for extended periods of time. SSD 130 may be accessed using controller software in the software stack running on processor 120. While FIG. 1 shows only one SSD 130, embodiments of the inventive concept may include storage devices of any type and connecting via any desired connection. Thus, SSD 130 may be replaced with Serial AT Attachment (SATA) hard disk drives, Ethernet SSDs, or storage devices of any other types. Further, embodiments of the inventive concept may include any number (zero or more) of storage devices, and each storage device may be of any desired type: thus, multiple different types of storage devices may be mixed in server 110.

Figure 2:
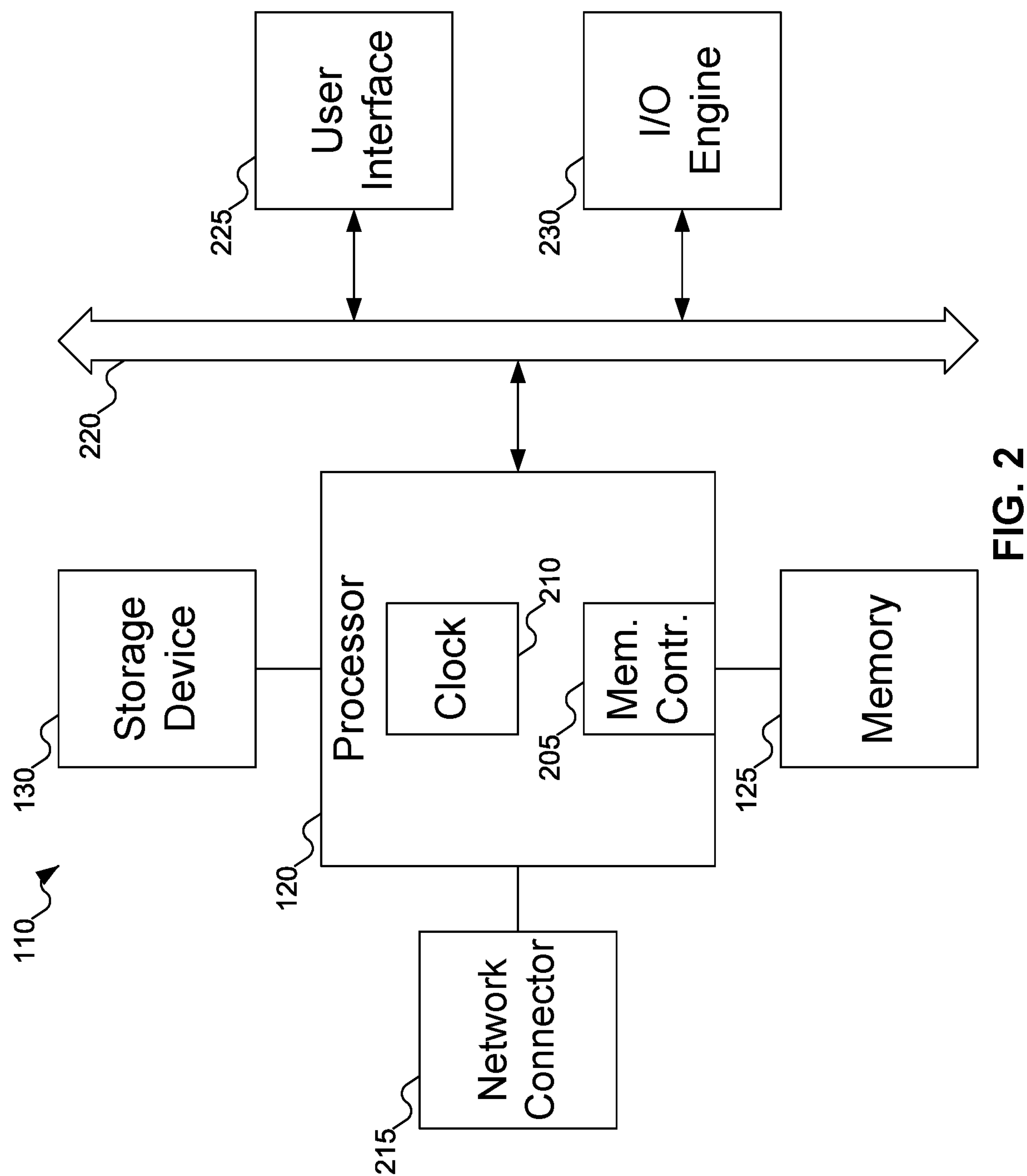
FIG. 2 shows details of the server of FIG. 1.

FIG. 2 shows details of server 110 of FIG. 1. In FIG. 2, typically, server 110 may include one or more processors 120, which may include memory controllers 205 and clocks 210, which may be used to coordinate the operations of the components of the machine. Processors 120 may also be coupled to memories 125, which may include random access memory (RAM), read-only memory (ROM), or other state preserving media, as examples. Processors 120 may also be coupled to storage devices 130, and to network connector 215, which may be, for example, an Ethernet connector or a wireless connector. Processors 120 may also be connected to buses 220, to which may be attached user interfaces 225 and Input/Output interface ports that may be managed using Input/Output engines 230, among other components.

Figure 3:
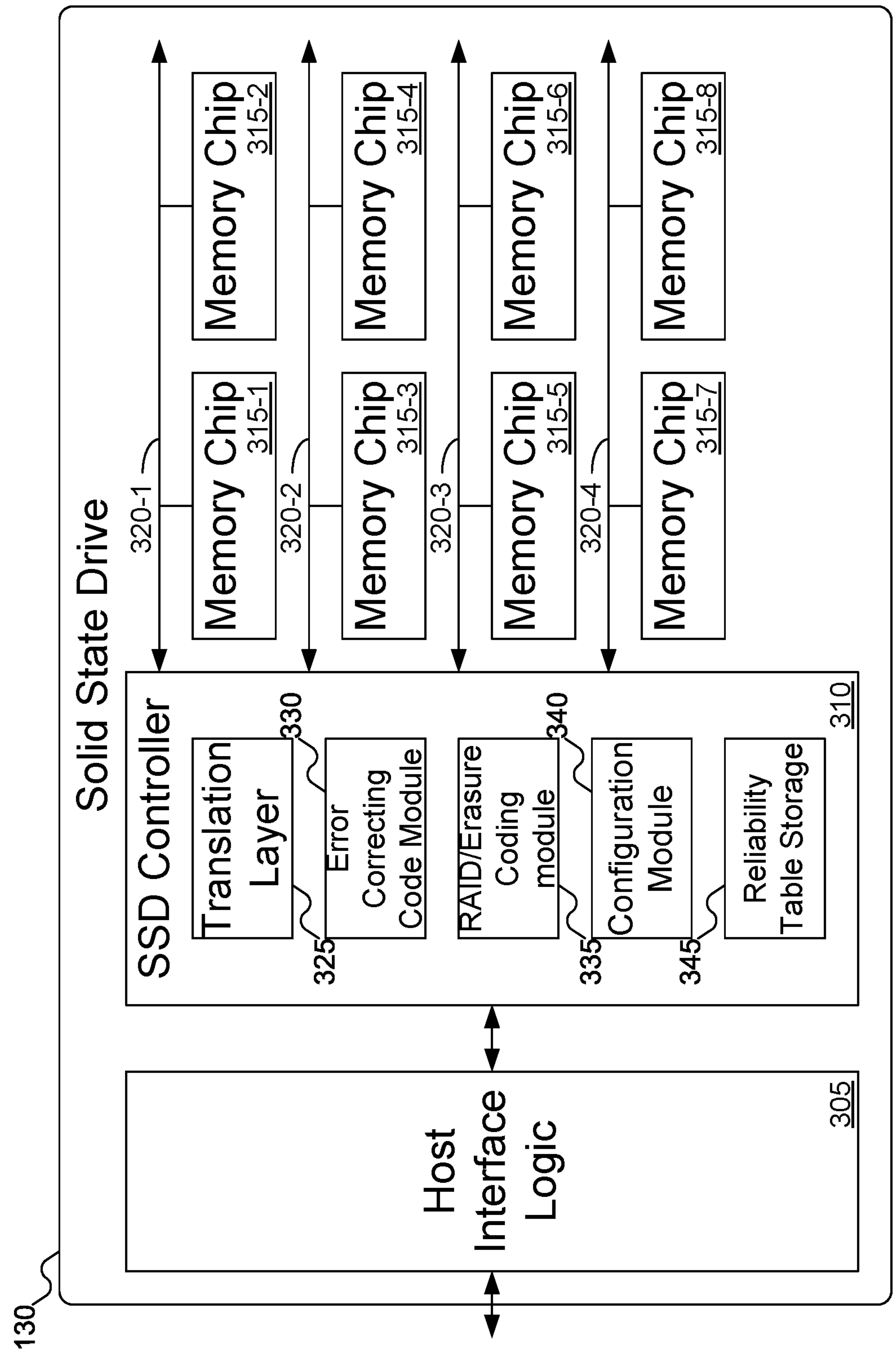
FIG. 3 shows details of the SSD of FIG. 1.

FIG. 3 shows details of SSD 130 of FIG. 1. In FIG. 3, SSD 130 may include host interface logic (HIL) 305, SSD controller 310, and various memory chips 315-1 through 315-8 (also termed "memory storage"), which may be organized into various channels 320-1 through 320-4. Host interface logic 305 may manage communications between SSD 130 and other components (such as processor 120 of FIG. 1 or other SSDs). These communications may include read requests to read data from SSD 130 and write requests to write data to SSD 130. Host interface logic 305 may manage an interface across only a single port, or it may manage interfaces across multiple ports. Alternatively, SSD 130 may include multiple ports, each of which may have a separate host interface logic 305 to manage interfaces across that port. Embodiments of the inventive concept may also mix the possibilities (for example, an SSD with three ports might have one host interface logic to manage one port and a second host interface logic to manage the other two ports).

SSD controller 310 may manage the read and write operations, along with garbage collection and other operations, on memory chips 315-1 through 315-8 using a memory controller (not shown in FIG. 3). Memory chips 315-1 through 315-8 may be any variety of memory chips, such as NAND flash memory chips or other Non-Volatile Memory chips, although embodiments of the inventive concept may extend to other storage systems such as Non-Volatile RAM (NVRAM).

SSD controller 310 may include translation layer 325, error correcting code module 330, RAID/erasure coding module 335, configuration module 340, and reliability table storage 345. Translation layer 325 may manage a mapping from logical block addresses (LBAs) used by applications running on processor 120 of FIG. 1 to physical block addresses (PBAs) where data is actually stored on SSD 130. By using translation layer 325 (in some embodiments of the inventive concept, translation layer 325 may be termed flash translation layer 325), SSD 130 may move data around on memory chips 315-1 through 315-8 without having to keep the application abreast of where the data currently resides (this may happen, for example, when the application requests that the data be overwritten with new values (SSDs generally do not support overwriting data in place, and therefore store the new data in a new location) or when a block that contains some valid data is subject to garbage collection). Translation layer 325 may be implemented as a table stored in some (preferably) non-volatile storage somewhere within SSD 130.

Error correcting code (ECC) module 330 may apply error correcting codes to data to be written to memory chips 315-1 through 315-8. In some embodiments of the inventive concept, ECC module 330 may be applied to the data regardless of which memory chip 315-1 through 315-8 will store the data; in other embodiments each channel 320-1 through 320-4 (or each memory chip 315-1 through 315-8) may have its own ECC module 330. ECC module 330 may implement any desired error correcting algorithm, and may therefore support detection and/or correction of any number of errors (depending on the implemented algorithm). Example algorithms that may be used by ECC module 330 include such as a parity codes, Cyclic Redundancy Check (CRC) codes, or Hamming codes. ECC module 330 may be implemented using a general purpose processor executing appropriate instructions, or using a Field Programmable Gate Array (FPGA), Application-Specific Integrated Circuit (ASIC), a Graphics Processing Unit (GPU), or any other desired implementation.

RAID/Erasure Coding module 335 may implement any desired RAID or erasure coding scheme to store data on memory chips 315-1 through 315-8. (Since a Redundant Array of Independent Disks, or RAID, describes a specific set of implementations of erasure coding, RAID/Erasure Coding module 335 may be more generally described as an Erasure Coding module with no reduction in functionality.) In general, RAID/Erasure Coding module 335 may take data to be written on SSD 130, divide that data into various units, and store those units on different memory chips 315-1 through 315-8. To introduce redundancy, the same data may be stored on multiple memory chips 315-1 through 315-8, or error correcting information (such as a parity codes, CRC codes, or Hamming codes) may be used. In this manner, errors may be detected and corrected. (Note that the same basic approaches may be used in both RAID/Erasure Coding module 335 and ECC module 330, but at different scales: the solutions therefore may complement each other.) Erasure Coding module 335 may be implemented using a general purpose processor executing appropriate instructions, or using an FPGA, an ASIC, a GPU, or any other desired implementation.

Configuration module 340 may be used to program what techniques are to be used to improve reliability. While one might wonder how different reliability techniques could be used, the answer is simple. ECC module 330 and RAID/Erasure Coding module 335 might offer support for different error correcting techniques, each with (potentially) different reliability rates. Configuration module 340 may be used to instruct ECC module 330 and/or RAID/Erasure Coding module 335 as to which error correcting technique may be used at a given time.

But this answer leads to a follow-up question: if there are different error correcting techniques that offer varying degrees of reliability, why not always use the most reliable approach? The answer is that the different techniques may have other implications for the operation of SSD 130, which may offset the benefit of the greater reliability. For example, consider the possibility that the same data might be stored in each of memory chips 315-1 through 315-8. This approach introduces eight-fold replication of the data, and the failure of a single memory chip would not lead to the loss of the data. The downside of this approach is that since the same data is stored eight times, the total available storage of SSD 130 is no greater than that of a single memory chip. Put in other ways, the total usable storage offered by SSD 130 would be only one eighth of the actual storage offered by SSD 130, or alternatively that 87.5% of the available storage is reserved for redundant copies of data. If the data is so sensitive that eight-fold replication is necessary, this price might be acceptable; but for most users such redundancy is overkill and the reduction in usable storage unacceptable.

Thus, configuration module 340 may be used to instruct (or program, or configure: whatever term may be preferred) ECC module 330 and RAID/Erasure Coding module 335 to use specific techniques from those offered by ECC module 330 and RAID/Erasure Coding module 335.

Aside from ECC module 330 and RAID/Erasure Coding module 335, there are other components that may be configured by configuration module 340: specifically memory chips 315-1 through 315-8. Different memory chips may offer different ways to store data, which may affect the reliability of the memory chips. To understand this fact, it is important to understand the different types of memory storage.

Memory manages data at varying levels of granularity, depending on what is happening. For example, the basic unit of access to read and write data is the page (which may be of any desired size: for example, 4 KB of data). Pages may be written if free. But pages may not be overwritten when new data replaces old data: in that situation the original page may be marked as invalid and the new data written to a new page. Pages are organized into groups called blocks: for example, a block might have 64 or 128 pages. The block (or the superblock, which is a group of blocks) is typically the unit for erasing data (which returns pages to the free state to be written anew). Thus, if there is any valid data in a block that has been selected for erasure, the valid data should be copied out of the block before the block is erased (lest the valid data be lost when the block is erased).

But even at finer levels, there are variations on data storage. Individual units, called cells, store data at finer granularity than the page. (Individual cells may not be directly accessible: the entire page may be read or written as a unit.) Each cell is designed to respond when varying voltages are applied: these different responses may be used to read (or write) the value to a cell.

In the simplest form, a cell has a single trigger voltage (which may be thought of as a point of demarcation) where its response changes. That is, apply a voltage below that trigger voltage and the response will be different from applying a voltage above that trigger voltage. Thus, for example, if an input voltage might vary anywhere from 0V to 5V, 2.5V might be the point at which the cell may start to respond. (How the cell responds may depend on the value stored in the cell. For example, if the cell represents a binary value of 0, the cell may output one voltage, whereas if the cell represents a binary value of 1, the cell may output another voltage.) Cells that store only a single bit are sometimes referred to as Single Level Cells (SLCs).

Multi-Level Cells (MLC) refer to cells that store more than one bit. While "multi" could be understood to mean "two or more", in practice MLCs typically may store two bits, while Triple Level Cells (TLCs) may store three bits, Quad-Level Cells (QLCs) may store four bits, and so on. Because MLCs (and all other types of cells that store more than one bit) store multiple bits, MLCs have multiple trigger voltages. For example, if an input voltage might vary anywhere from 0V to 5V, an MLC might have trigger voltages at 1V, 2V, 3V, and 4V. Depending on the trigger voltage, the flash memory chip may determine the actual value stored in the cell. Thus, for example, if the trigger voltage is 1V, the cell may store the value 00; if the trigger voltage is 2V, the cell may store the value 01; if the trigger voltage is 3V, the cell may store the value 10; and if the trigger voltage is 4V, the cell may store the value 11.

The various cell types have different advantages/disadvantages. Obviously, the ability to store more than one bit of information per cell means that fewer cells are needed to store the same amount of data. Thus, if data is stored in SLCs, more SLCs are needed than MLCs, TLCs, or QLCs would be needed to store the same amount of data. While individual cells that store more bits tend to be more expensive than cells that store fewer bits, the increased cost may be offset by needing fewer such cells. Thus, to store the same amount of data, in general QLCs may be cheaper than TLCs, which may be cheaper than MLCs, which may be cheaper than SLCs.

But there are other factors that may offset cost. First, since the SSD has to test the cells against multiple different voltages to determine the value stored in a cell, the more such tests that need to be performed may slow down the performance of the cell. For example, consider a QLC. Since a QLC stores four bits of data, the QLC may take any of 16 possible values. Thus, to read the QLC may require testing the QLC against 16 possible trigger voltages, which takes longer than testing a cell against two trigger voltages. Thus, QLCs may be slower to read than TLCs, which may be slower to read than MLCs, which may be slower than SLCs. In addition, the more bits the cell may store, the fewer the number of program/erase cycles in the cell's lifetime. For example, SLCs may guarantee 100,000 program/erase operations before a cell may fail, whereas that number may drop to 10,000 for MLCs, 1,000 for TLCs, and 100 for QLCs. Therefore, different types of cells may be better utilized for different storage profiles: QLCs may be better used to store data that almost never changes, whereas SLCs may be used for data that changes with relative frequency.

A final disadvantage of cell types relates back to the number of trigger voltages needed for cells that store higher densities of data. The greater the number of trigger voltages, the more closely spaced those trigger voltages may be to each other. But the closer the trigger voltages are to each other, the more vulnerable the cell is to potential error. For example, consider a QLC. Since a QLC may store four bits of data, there are 16 possible values in the QLC. To distinguish among 16 possible values may require 16 trigger voltages, which means the gap between trigger voltages may be little more than 0.25V. It would not require a tremendous dip or surge in voltage for the cell to think it is responding to a different voltage than that actually intended, which means that the QLC might respond incorrectly to an attempt to read the cell. (This same analysis is applicable to MLC and TLC cell types as well, although the margins of error are larger since there are fewer trigger voltages to consider.)

So, returning to the question of reliability, QLCs may store higher data densities, but at the cost of reduced margins of error. But just because a QLC (or any type of cell that stores two or more bits of data) may store multiple bits does not mean that the QLC must store multiple bits. Such a QLC might be used to store fewer than four bits of data, with any values assigned to the other bits in the QLC being ignored on read operations. By storing fewer bits in the QLC, the effective number of trigger voltages is reduced, which may widen the margins of error. (Note that the QLC may still be hardwired to test against all 16 trigger voltages; only the possibility of an error is reduced, not the time required to access the cell.)

For example, assume that a QLC were used to store only one bit of data. This value (be it 0 or 1) may be stored in any of the four bits of the QLC, with the other bits effectively ignored by the SSD (that is, those bits may be assigned any arbitrary values at the time the cell is written, and any values read from those bits may be ignored and only the bit of interest returned). Since the QLC now effectively has only one trigger voltage, the likelihood that the cell is written or read incorrectly (for example, due to a voltage fluctuation) is reduced.

Thus, it may also be possible to influence the reliability of the SSD by changing the operational behavior of even flash memory chips 315-1 through 315-8. But there are a couple of caveats to consider. First, whether the reliability of the SSD may be influenced by changing the operational behavior of flash memory chips 315-1 through 315-8 depends on the type of cells used in flash memory chips 315-1 through 315-8. The higher the data density of the cells, the more options there are to influence the reliability of the SSD. SLCs, for example, only store one bit of data, so the reliability of an SSD that uses only SLCs may not be improved by changing the operational behavior of the SLCs.

Further, the improvement described above operates only in one direction. A cell that is capable of storing a higher density of data may be used to store lower density data by ignoring some of the bits in the cell. But it is not possible to decrease the reliability of the SSD by attempting to store more bits in the cell than the cell may store. For example, since an SLC may only store one bit of data, it is not possible (regardless of the reduction in reliability that might be tolerated) to store two bits in an SLC. (Of course, a cell that stores fewer bits than it is capable of storing may have its data density increased, provided the increase does not exceed the capabilities of the cell. Thus, for example, a QLC that is capable of storing four bits but is currently storing only two bits may have its data density increased to three bits or four bits, but not to five bits.)

Second, as with using flash memory chips 315-1 through 315-8 to all store the same data, storing fewer bits in a cell than it is capable of storing may result in less usable storage in the SSD. For example, consider an SSD that uses QLC cells and has a total available storage capacity of 1 TB. If the QLCs are used to store only one bit per cell, then the SSD has an effective capacity of only 256 GB (25% of the total available storage capacity): the remaining 768 GB of storage are "lost" in the unused bits of the QLCs.

On the other hand, different flash memory chips may be configured to achieve different overall reliabilities. Thus, for example, assume that flash memory chips 315-1 through 315-8 all use QLC cells. Flash memory chip 315-1 may be configured to store only one bit in each cell, thereby offering increased reliability at the cost of reduced available storage. Flash memory chip 315-2, on the other hand, may be configured to store four bits in each cell, thereby offering maximum available storage at the cost of lower reliability.

Configuration module 340 may be implemented using a general purpose processor executing appropriate instructions, or using an FPGA, an ASIC, a GPU, or any other desired implementation. In FIG. 3, ECC module 330, RAID/Erasure Coding module 335, and configuration module 340 are shown as different components. Because these components may be manufactured separately and installed in SSD 130, they may be implemented as separate components. In addition, these components may actually reside in physically different locations. For example, as discussed above and further below with reference to FIG. 5, ECC module 330 may apply to individual channels (but to multiple memory chips), whereas RAID/Erasure Coding module 335 may apply across multiple channels. In such configurations, it is unlikely that any of ECC module 330, RAID/Erasure Coding module 335, and configuration module 340 may be implemented using common hardware. But in some embodiments of the inventive concept it may be possible for any or all of these components to be implemented using common hardware.

Figure 5:
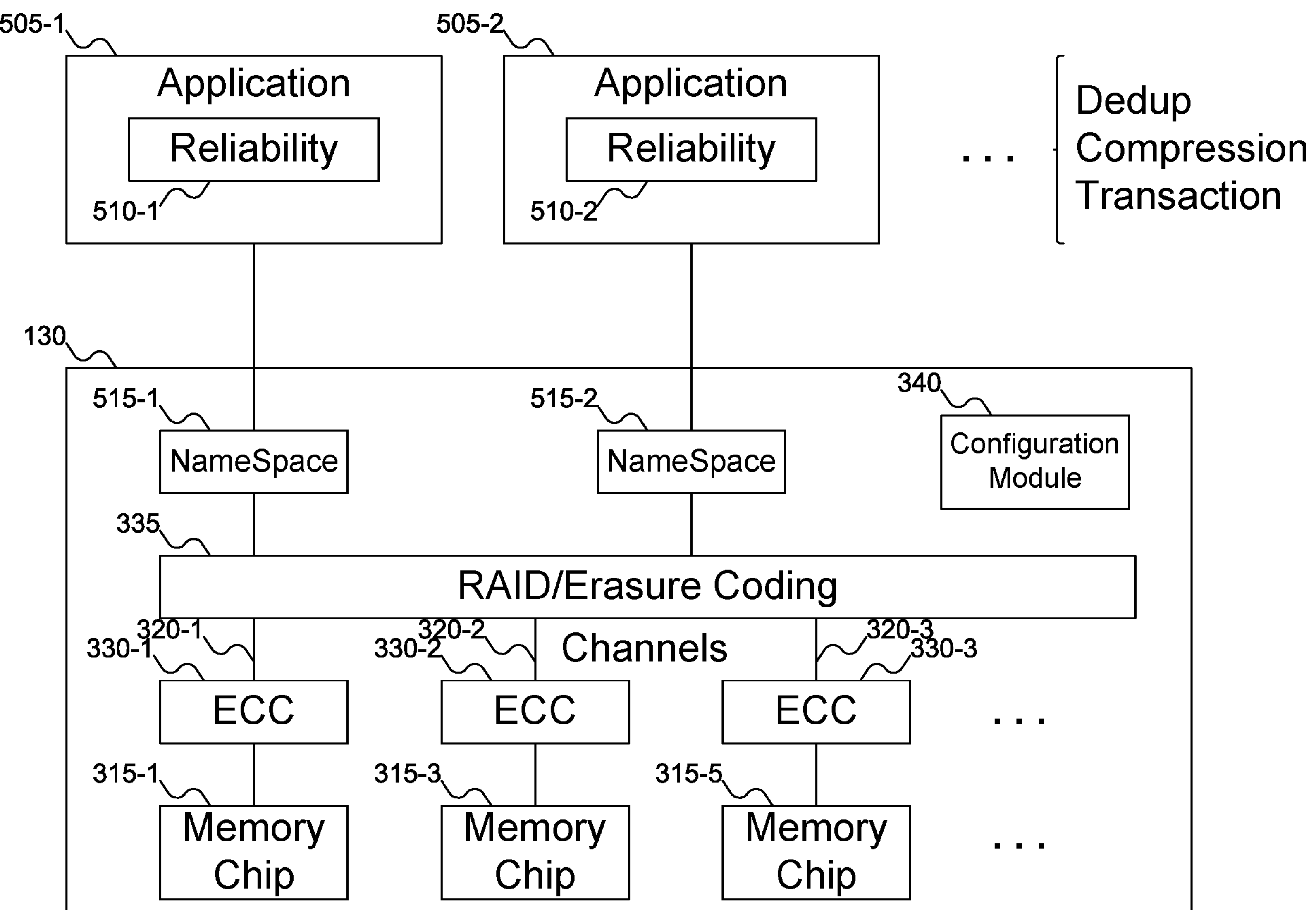
FIG. 5 shows an alternative view of the SSD of FIG. 1.
Figure 6:
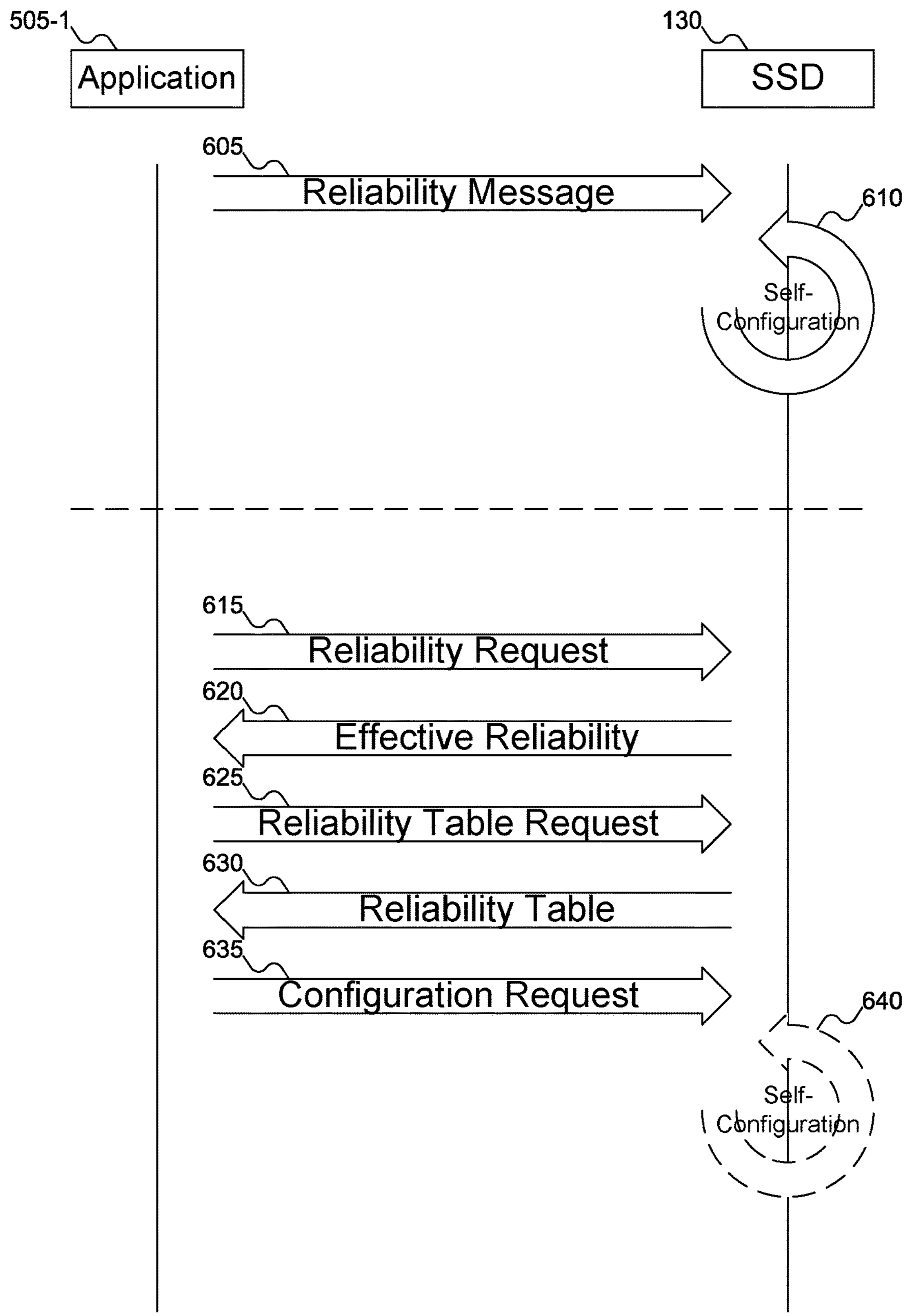
FIG. 6 shows messages exchanged between an application of FIG. 5 and the SSD of FIG. 1.

The above discussion focuses on what configuration module 340 may do to configure memory chips 315-1 through 315-8, ECC module 330, and RAID/Erasure Coding module 335, but no explanation has yet been given as to what would trigger configuration module 340 to perform such operations. FIGS. 5-6 below discuss what might trigger configuration module 340 to perform its operations.

Finally, to support configuration module 340, SSD 130 may include reliability table storage 345. Reliability table storage 345 may store a reliability table. This reliability table may provide information about the reliability offered by various combinations of schemes used by memory chips 315-1 through 315-8, ECC module 330, and RAID/Erasure Coding module 335.

Figure 4:
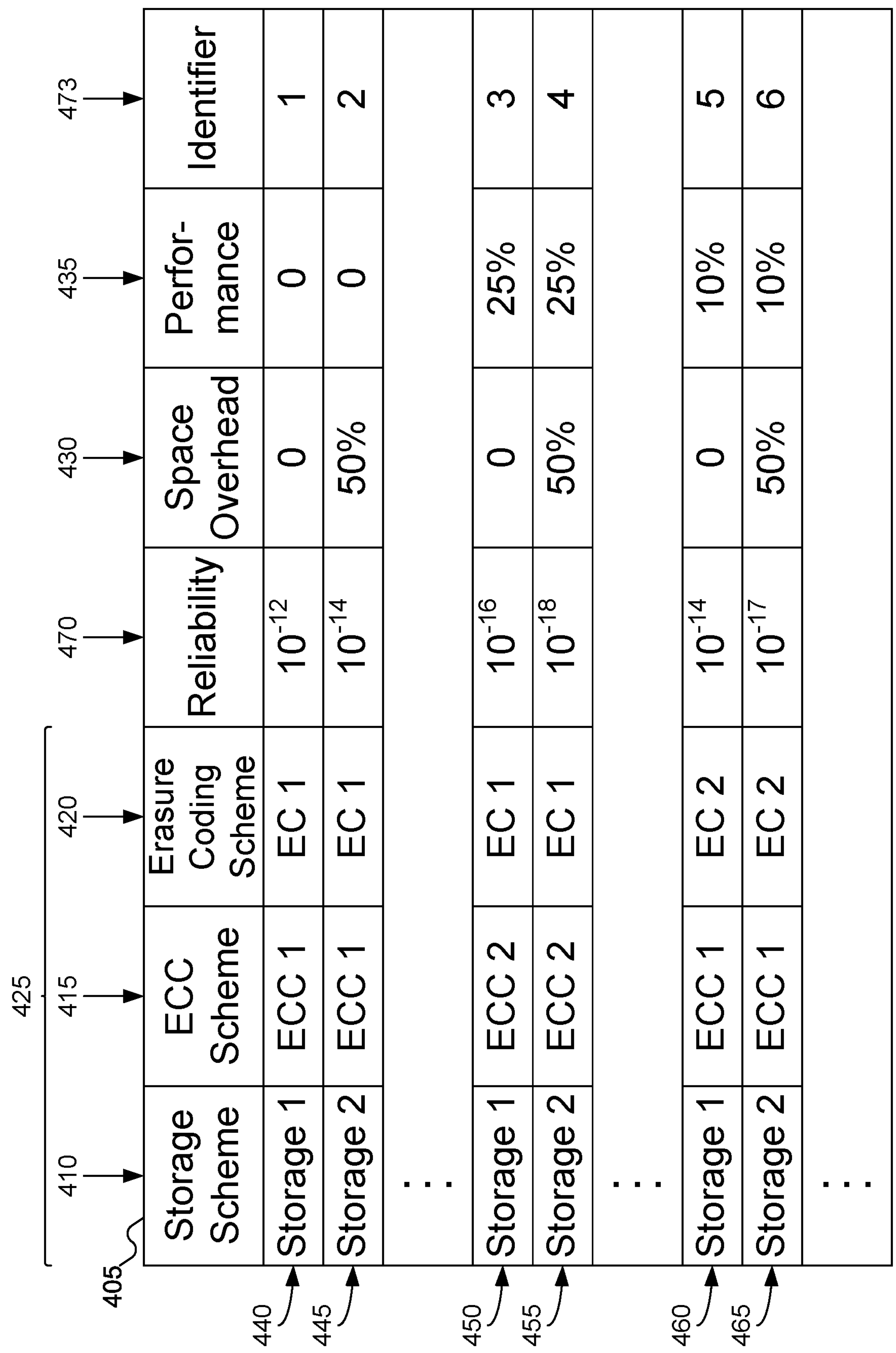
FIG. 4 shows a reliability table for the SSD of FIG. 1.

FIG. 4 shows a reliability table for SSD 130 of FIG. 1. In FIG. 4, reliability table 405 is shown. Reliability table 405 includes various columns, such as storage schemes 410, ECC schemes 415, and erasure coding schemes 420. Collectively, storage schemes 410, ECC schemes 415, and erasure coding schemes 420 form configurations 425: that is, for a given entry in reliability table 405, storage schemes 410, ECC schemes 415, and erasure coding schemes 420 specify how memory chips 315-1 through 315-8 of FIG. 3, ECC module 330 of FIG. 3, and RAID/Erasure Coding module 335 of FIG. 3 may be configured. Other columns may include reliability 420 (which may specify the overall reliability of a given configuration), space overhead 430 (which may specify any space limitations incurred by using the particular configuration) and performance 435 (which may specify any performance limitations incurred by using the particular configuration). If reliability alone is the driving consideration in how to configure SSD 130 of FIG. 1, then space overhead 430 and performance 435 may be omitted from reliability table 405.

Reliability table 405 may include entries for each possible configuration of SSD 130 of FIG. 1. For example, FIG. 4 shows reliability table as including six entries 440, 445, 450, 455, 460, and 465. Each entry represents a different possible configuration of SSD 130 of FIG. 1. Thus, for example, entry 440 identifies the reliability for a configuration that uses Storage scheme 1 for memory chips 315-1 through 315-8 of FIG. 3, ECC scheme 1 for ECC module 330 of FIG. 3, and Erasure Coding scheme 1 for RAID/Erasure Coding module 335 of FIG. 3. For this configuration, the overall reliability is 1 error in $10^{12}$ bits written or read. This configuration also imposes no space overhead or performance overhead (entry 440 may represent, for example, the default configuration of SSD 130 of FIG. 1, in which case the reliability rate for entry 440 may be the advertised reliability rate for SSD 130 of FIG. 1). In contrast, entry 445 represents a configuration that uses Storage scheme 2 for memory chips 315-1 through 315-8 of FIG. 3, ECC scheme 1 for ECC module 330 of FIG. 3, and Erasure Coding scheme 1 for RAID/Erasure Coding module 335 of FIG. 3.

This configuration has a reliability rate of 1 error in $10^{14}$ bits written or read, but imposes a 50% reduction in the available storage capacity of SSD 130 of FIG. 1 (but no performance overhead). For example, entry 445 may represent a configuration where data is written to two different memory chips for redundancy, which improves the overall reliability of SSD 130 but at the cost of reducing the amount of available storage.

Entries 450 and 455 are similar to entries 440 and 445, but with ECC module 330 of FIG. 3 using ECC scheme 2. As may be seen, these configurations have reliability rates of 1 error in $10^{16}$ and $10^{18}$ bits, respectively: a $10^4$ improvement over the configurations shown in entries 440 and 445. But because ECC scheme 2 may require more computational resources than ECC scheme 1, the configurations represented by entries 450 and 455 may impose a performance hit of 25% (that is, SSD 130 of FIG. 1 may require 25% more time to process a read and/or write request using the configurations represented by entries 450 and 455 than the configurations represented by entries 440 and 445).

Entries 460 and 465 are similar to entries 440 and 445, but with RAID/Erasure Coding module 335 of FIG. 3 using Erasure Coding scheme 2. As may be seen, these configurations have reliability rates of 1 error in $10^{14}$ and $10^{17}$ bits, respectively, which represent 10-100 times greater reliability. But because Erasure Coding scheme 2 may require more computational resources than Erasure Coding scheme 1, the configurations represented by entries 460 and 465 may impose a performance hit of 10% (that is, SSD 130 of FIG. 1 may require 10% more time to process a read and/or write request using the configurations represented by entries 460 and 465 than the configurations represented by entries 440 and 445).

Note that the improvement offered by Erasure Coding scheme 2 alone is not the same for both of configurations 460 and 465. Entries 460 and 465 represent the fact that while combining different schemes for different components of SSD 130 of FIG. 1 may offer improvements relative to only one component providing any reliability, neither are the benefits of combining schemes for different components entirely orthogonal. Put another way, using reliability options of multiple components may be superior to using a reliability option of a single component, but the reliability rates of the two components may not simply be multiplied together to determine the reliability rate when both components are used to enhance reliability. Thus, for example, even if there are particular schemes that offer error rates of 1 error $10^{10}$ bits read or written in memory chips 315-1 through 315-8 of FIG. 3, ECC module 330 of FIG. 3, and RAID/Erasure Coding module 335 of FIG. 3, using all three schemes together does not necessarily result in an error rate of 1 bit in $10^{30}$ bits read or written.

So if the reliability rate of a combination of schemes may not be calculated as the product of the reliability rates of the separate schemes, how might the reliability rate of a particular configuration be determined for entry in reliability table 405? The answer is for the manufacturer of SSD 130 of FIG. 1 to test every possible configuration separately. That is, various SSDs may be configured to use each possible combination of configurations. These SSDs may then be tested to see what their respective error rates (and space overhead, and performance overhead) are. This information may then be stored in reliability table 405 for all SSDs manufactured according to the same specifications.

In addition, while FIG. 4 shows only combinations of different schemes for reliability using each of memory chips 315-1 through 315-8 of FIG. 3, ECC module 330 of FIG. 3, and RAID/Erasure Coding module 335 of FIG. 3, reliability table 405 may also be used to show the reliability rates (and space and performance overheads, if desired) of individual schemes. For example, reliability table 405 may include entries for storage schemes 1 and 2 for memory chips 315-1 through 315-8 of FIG. 3, with no associated schemes for ECC module 330 of FIG. 3 or RAID/Erasure Coding module 335 of FIG. 3: in that case, those entries may represent the reliability rate of using storage schemes 1 and 2, respectively (without adding any reliability enhancement from ECC module 330 of FIG. 3 or RAID/Erasure Coding module 335 of FIG. 3). Similarly, reliability table 405 may include entries for just ECC schemes 1 and 2, and/or for Erasure Coding schemes 1 and 2.

Reliability table 405 may be searched along multiple axes. For example, reliability table 405 may be used to determine the reliability (and other consequences, such as space overhead and/or performance) of a particular configuration. Reliability table 405 may also be used to determine a configuration that supports a particular reliability. That is, given a particular desired reliability rate, reliability table 405 may be searched to find a particular configuration to offers that reliability rate (or a superior reliability rate).

If multiple configurations may offer the desired reliability rate (or a superior reliability rate), configuration module 340 of FIG. 3 may select among the options using any desired approach. For example, configuration module 340 of FIG. 3 might select the configuration that offers the highest reliability rate, or the lowest reliability rate that meets or exceeds the desired reliability rate. Or, configuration module 340 of FIG. 3 may use the space overhead and/or the performance consequences of the configuration (if included in reliability table 405) to select the configuration that offers a sufficient reliability rate with the fewest other consequences. Configuration module 340 of FIG. 3 may also use any other desired technique to select from among multiple configurations that offer sufficient reliability.

To assist in identifying a particular combination in reliability table 405, reliability table 405 may also include identifier 475. Identifier 475 may be a unique identifier assigned to each entry in reliability table 405. Thus, for example, entry 440 may by assigned identifier "1", entry 445 may be assigned identifier "2", and so on. Note that there is no requirement that identifiers 475 be numerical or sequential. For example, identifiers 475 may be random strings, or hashes of information shown in the entry, or any other desired identifiers. The only helpful element is that identifiers 475 may be unique, so that a unique entry in reliability table 405 may be located using a given identifier.

Returning to FIG. 3, while FIG. 3 shows SSD 130 as including eight memory chips 315-1 through 315-8 organized into four channels 320-1 through 320-4, embodiments of the inventive concept may support any number of memory chips organized into any number of channels. Similarly, while FIG. 3 shows the structure of an SSD, other storage devices (for example, hard disk drives) may be implemented using a different structure, but with similar potential benefits.

FIG. 5 shows an alternative view of SSD 130 of FIG. 1. In FIG. 5, SSD 130 is shown as including RAID/Erasure Coding module 335, ECC modules 330-1, 330-2, and 330-3, which may operate along channels 320-1, 320-2, and 320-3, respectively, which include memory chips 315-1, 315-2, and 315-5. Thus, data may be organized using RAID or Erasure Coding to be stored on multiple memory chips, each of which may be on different (or the same) channels.

Data may be received from applications 505-1 and 505-2 (although there may be any number (one or more) of applications). Each application may have its own desired reliability 510-1 and 510-2. Each applications' desired reliability represents the reliability rate that that application desires. Note that desire reliabilities 510-1 and 510-2 do not have to agree: each application may expect a different reliability rate.

Each application 505-1 and 505-2 may have its own associated namespace 515-1 and 515-2, respectively. Namespaces 515-1 and 515-2 provide ways to organize data coming in from each application so that they may be easily identified and/or grouped together. The use of namespaces 515-1 and 515-2 is optional.

FIG. 5 refers to the concepts of data deduplication and compression. Data deduplication references the idea that there may be multiple copies of a particular data stored on SSD 130. Rather than storing the multiple copies, a single copy may be stored and the other copies reference the stored copy. In so doing, the amount of space that would be used in storing the multiple files is reduced.

For example, consider an image file, such as a photograph. It is not unusual for the same photograph to be stored multiple times, perhaps with different file names (as it is easy to forget that the photograph was previously stored using a different name). But it is simple enough for the host machine or SSD 130 to recognize that a particular file is a duplicate of a previously stored file (assuming SSD 130 includes some processing capability to identify duplicate files). There is no need to store the same photograph multiple times: a single copy will suffice (with references from the other folders where the duplicates were stored).

As an example of how data duplication may be identified, a cryptographic hash may be generated of each file. If the cryptographic hashes of two files are the same, there is a possibility (perhaps a strong possibility) that the two files contain the same data. Thus, determining if a new file is duplicate of a file already stored on SSD 130 merely requires generating the cryptographic hash of the new file, comparing that cryptographic hash against cryptographic hashes of other files (perhaps using a hash table), and if a match is found then performing a (detailed) comparison of the data in the matched files.

Note that data deduplication may operate on any desired unit of data. While files are a common unit for data deduplication, other units may be blocks or pages (units of data within SSD 130). Still other units of data may also be used.

Compression, on the other hand, refers to techniques by which data may be stored in a manner that takes up less space than the raw data. Consider, for example, the number $10^{100}$ (commonly referred to a googol). To store this number as a raw value would require approximately $2^{300}$ bits, or $2^{38}$ bytes (assuming a computer was designed to store an integer this large). On the other hand, this number could also be represented as a "1" followed by 100 "0"s. Using an encoding scheme such as Run Length Encoding, this value could be represented using four bytes: 1, 1, 100, 0 (that is, one copy of the value "1", and 100 copies of the value "0"). Since four bytes is considerably less than $2^{38}$ bytes, the space savings of using encoding for this value is significant to say the least. (While "compression" as a term typically refers to algorithms that encode data using structures such as Huffman codes, in this context "compression" refers to any technique that may be used to reduce the amount of space taken up by data, and thus may include techniques commonly referred to using terms such as "encoding".)

While data deduplication and compression have their benefits, in that they reduce the "footprint" data may take on a storage device, they have potential disadvantages as well, particularly when discussing errors. Assume, for example, that a particular file as stored on SSD 130 actually contains data for five different files (one original and four duplicates). Since the four duplicates point to the same data as the original file, if there is a single bit error anywhere in the stored file, then that error would be read whenever any of the file different files is accessed. Thus, a single bit error for the data stored on SSD 130 would actually be better understood to be five bit errors: one for the same bit error in the original file and each duplicate. In other words, data deduplication has magnified the error rate of SSD 130 by the number of referenced copies of the file.

Similarly, compression may affect what the true error rate is. Consider again the example of how $10^{100}$ may be stored using Run Length Encoding. If the value "0" were replaced with "1" (a single bit error), that error would be magnified across the entire length of the encoding. Instead of representing $10^{100}$, the encoding would now represent the digit "1" repeated 101 times: a very different value. Thus, a single bit error on compressed data may actually more effectively mean a large number of bit errors. As a general guide, a single bit error may be magnified roughly in proportion to the compression ratio of the technique used. Thus, if the compression technique results in compressing the data by two (that is, taking half as much space), a single bit error effectively means two bit errors in the data; if the compression technique results in compressing the data by three (that is, taking one third as much space, a single bit error effectively means three bit errors in the data, and so on. (In the worst case, a single bit error in compressed data might actually make it impossible to recover the raw data at all.)

Thus, while the entries in reliability table 405 of FIG. 4 are a useful starting point for the reliability of SSD 130, they may not completely represent the true reliability of SSD 130. To that end, SSD 130 (possibly through configuration module 340) may track transactions (of which data deduplication and compression are two examples) being carried out on behalf of applications 505-1 and 505-2, and use those transactions to determine a multiplier. The reliability of SSD 130 (as determined from reliability table 405 of FIG. 4 based on the configuration of SSD 130) may then be multiplied by this multiplier to determine the effective reliability rate of SSD 130.

The multiplier for the reliability rate may be determined using any desired approaches. For example, SSD 130 may track a particular transaction, determine the multiplier applicable to that transaction, and then keep the larger of that multiplier and the previous multiplier. But this approach assumes that multipliers are independent of each other. If data deduplication was the only technique used that could introduce a multiplier, or if compression was the only technique used that could introduce a multiplier, such an assumption might be reasonable. But if a file that is compressed is then subject to data deduplication, a single bit error could be multiplied as a result of both space-saving regimens.

Thus, SSD 130 might track not only the highest multiplier to date, but also the highest multiplier applicable to each space-saving scheme separately. That way SSD 130 may consider not only whether the new multiplier is the highest multiplier for a single scheme, but also whether the multiplier may cross schemes. For example, assume that SSD 130 currently tracks the following: 2.0 for the highest compression multiplier, 5.0 for the highest data deduplication multiplier, and 5.0 for the highest overall multiplier (on the assumption that no file subject to compression has been stored on SSD 130 more than twice). If SSD 130 then tracks that a file that has previously been both compressed and deduplicated is written a third time, that would mean that three copies of that file have now been stored on SSD 130 (and deduplicated). Thus, while the this transaction does not increase either the highest compression multiplier (since no new compression has occurred) or the highest deduplication multiplier (since the current maximum number of duplicates for any file is five), the highest overall multiplier may be increased to 6.0 (as there are three copies of a compressed file subject to 2.0 multiplier). Thus, whatever the reliability rate might otherwise be (as may be advertised in reliability table 405 of FIG. 4), that reliability rate may be multiplied by 6.0 to determine the effective reliability for SSD 130. Alternatively, SSD 130 might track the highest multipliers for compression and data deduplication respectively and apply both of them to a reliability to determine a minimum effective reliability for SSD 130. (This calculation may over-emphasize the impact of transactions, since there might be no data stored on SSD 130 that is subject to both compression and data deduplication, but a conservative calculation may nonetheless be used.)

This impact of transactions on the effective reliability of SSD 130 may also factor into the selection of a configuration for SSD 130. For example, knowing that due to data stored on SSD 130 there is a multiplier, configuration module 340 may use that multiplier when comparing the reliability of various configurations with desired reliabilities 510-1 and 520-2 of applications 505-1 and 505-2. That is, it may not be enough to simply compare the reliabilities listed in reliability table 405 of FIG. 4 with desired reliabilities 510-1 and 510-2: the reliabilities listed in reliability table 405 of FIG. 4 may need to be adjusted according to the multiplier to reflect the effective reliability of SSD 130 given the data currently stored on SSD 130.

FIG. 6 shows messages exchanged between application 505-1 of FIG. 5 and SSD 130 of FIG. 1. In one embodiment of the inventive concept, application 505-1 may send reliability message 605 to SSD 130: reliability message 605 may include desired reliability 510-1 of FIG. 5. (Although not shown in FIG. 6, application 505-2 of FIG. 5, along with any other applications that use SSD 130, may send their own desired reliabilities as well.) Then, SSD 130 may configure itself (using configuration module 340 of FIG. 3) to satisfy all of the provided desired reliabilities (that is, by satisfying the most stringent reliability provided), as shown by self-configuration 610.

But in another embodiment of the inventive concept, application 505-1 may send reliability request 615. Reliability request 615 may request the effective reliability of SSD 130 (determined as described above), which may be returned as message 620. Application 505-1 may also send reliability table request 625, which may request reliability table 405 of FIG. 4 from SSD 130: SSD 130 may respond by returning reliability table 405 of FIG. 4 in message 630. Application 505-1 may then select the configuration that provides a sufficient reliability (desired reliability 470 of FIG. 5 or some superior configuration), and may send configuration request 635 to SSD 130, identifying the entry in reliability table 405 of FIG. 4 that application 505-1 desires. SSD 130 may then configure itself according to the identified entry of reliability table 405, as shown by self-configuration 640.

But note that self-configuration 640 is shown in dashed lines. There are two reasons for this. First, presumably application 505-1 would compare the effective reliability rate received in message 620: if the effective reliability rate is higher than desired reliability 510-1 of FIG. 5, then application 505-1 would not send configuration request 635 (in which case self-configuration 640 would not be needed). But in some embodiments of the inventive concept application 505-1 might not request the effective reliability from SSD 130, instead simply selecting the desired configuration from reliability table 405 of FIG. 4 and sending configuration request 635 accordingly. In such embodiments of the inventive concept, SSD 130 (perhaps via configuration module 340) may compare the effective reliability with the configuration identified in configuration request 635. If the effective reliability of SSD 130 is greater than the reliability of the configuration identified in configuration request 635, SSD 130 may skip self-configuration 640 (since the current configuration is already good enough).

Second, as noted above, application 505-1 may not be operating in isolation: other applications (such as application 505-2 of FIG. 5) may be sending their own configuration requests 635. In such a situation, SSD 130 may choose to self-configure in a manner that satisfies all applications, and therefore may configure according to the configuration with the highest reliability rate (on the assumption that the application requesting that configuration may not be satisfied by a configuration with a lower reliability). Thus, while SSD 130 may perform self-configuration 640, self-configuration 640 may involve a different configuration than that specified in configuration request 635.

In FIG. 6, configuration module 340 may respond to application 505-1 in configuring SSD 130 of FIG. 1. But configuration module 340 may also operate "spontaneously" to configure SSD 130 of FIG. 1. For example, given a desired reliability (which may be desired reliability 510-1 of FIG. 5 as received from application 505-1 in reliability message 605, or which may be the advertised reliability of SSD 130 of FIG. 1, according to the manufacturer, among other possibilities), configuration module 340 may track the effective reliability of SSD 130 of FIG. 1. If the effective reliability of SSD 130 of FIG. 1 should drop below the desired reliability, configuration module 340 may select a new configuration that provides the desired reliability (factoring in any multipliers), to ensure that the reliability of SSD 130 of FIG. 1 remains at an acceptable level.

It is worth mentioning how configuration module 340 may configure SSD 130 of FIG. 1. As discussed above, the entries in reliability table 405 of FIG. 4 specify particular schemes to be used by memory chips 315-1 through 315-8 of FIG. 3, ECC module 330 of FIG. 3, and RAID/Erasure Coding module 335 of FIG. 3. To configure SSD 130 of FIG. 1, configuration module 340 may instruct these components regarding what schemes to use. That is, configuration module 340 may instruct memory chips 315-1 through 315-8 of FIG. 3 to store a particular number of bits in each cell, and/or instruct ECC module 330 of FIG. 3 to use a particular ECC scheme, and/or instruct RAID/Erasure Coding module 335 of FIG. 3 to use a particular erasure coding scheme. Note that changing schemes with data already in place may involve reading data from SSD 130 of FIG. 1 and changing the scheme applied to that data, so that sufficient reliability is maintained. Thus, for example, if data is currently stored using four bits in each QLC cell but now needs to be stored with only two bits in each QLC cell, the data in memory chips 315-1 through 315-8 of FIG. 8 may be read, buffered temporarily somewhere (either in some local storage or in the main memory of server 110), then written back to memory chips 315-1 through 315-8 using the new storage scheme. Similarly, applying a new ECC scheme or Erasure Coding scheme may involve reading data from and writing data to SSD 130 to apply the changes.

Figure 7:
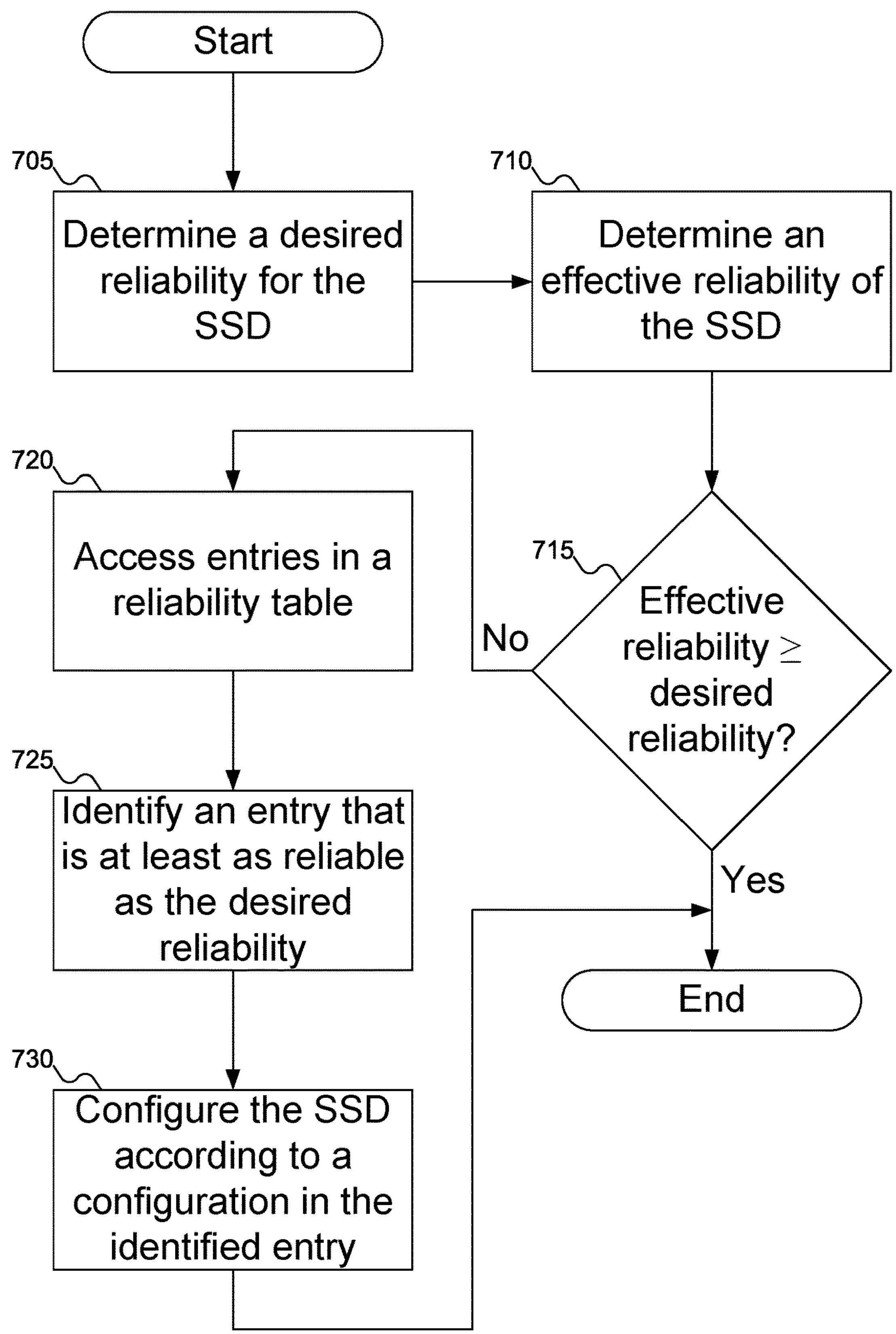
FIG. 7 shows a flowchart of an example procedure for the SSD of FIG. 1 to configure itself to provide a desired reliability, according to an embodiment of the inventive concept.

FIG. 7 shows a flowchart of an example procedure for SSD 130 of FIG. 1 to configure itself to provide a desired reliability, according to an embodiment of the inventive concept. In FIG. 7, at block 705, configuration module 340 of FIG. 3 may determine a desired reliability for SSD 130 of FIG. 1. As discussed above, configuration module 340 of FIG. 3 may select its own desired reliability, or it may receive desired reliability 510-1 of FIG. 5 from application 505-1 of FIG. 5 in reliability message 605 of FIG. 6. At block 710, configuration module 340 of FIG. 3 may determine the effective reliability of SSD 130 of FIG. 1. At block 715, configuration module 340 of FIG. 3 may compare the effective reliability of SSD 130 of FIG. 1 with the desired reliability (factoring in any multipliers due to transactions). If the effective reliability is enough to satisfy the desired reliability, then processing is complete, and configuration module 340 of FIG. 3 need do nothing further.

On the other hand, if effective reliability is less than the desired reliability, then at block 720, configuration module 340 of FIG. 3 may access reliability table 405 of FIG. 4 to consider entries therein. At block 725, configuration module 340 of FIG. 3 may select an entry in reliability table 405 of FIG. 4 that has a reliability at least as high (factoring in any multipliers) as the desired reliability. At block 730, configuration module 340 of FIG. 3 may configure SSD 130 of FIG. 1 according to the configuration in the selected entry in reliability table 405 of FIG. 4, after which processing is complete.

Figure 8:
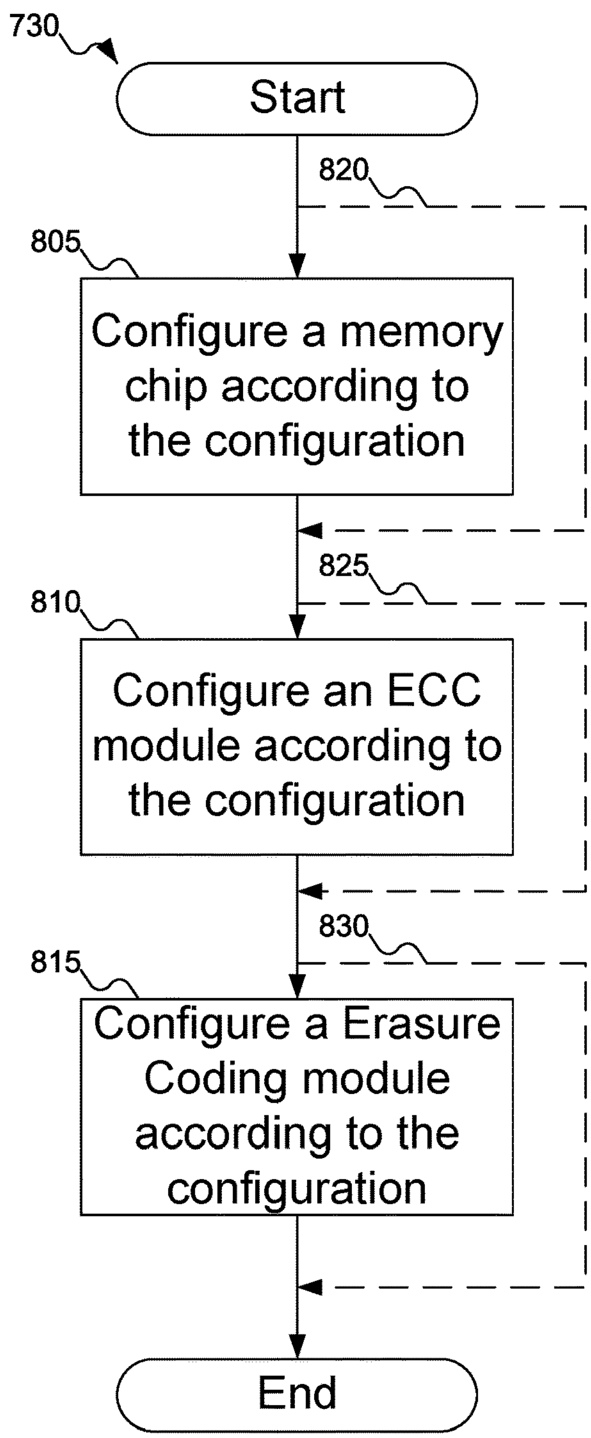
FIG. 8 shows a flowchart of an example procedure for the SSD of FIG. 1 to configure itself.

FIG. 8 shows a flowchart of an example procedure for SSD 130 of FIG. 1 to configure itself. In FIG. 8, at block 805, configuration module 340 of FIG. 3 may configure one or more memory chips 315-1 through 315-8 of FIG. 3 to use a particular storage scheme. At block 810, configuration module 340 of FIG. 3 may configure ECC module 330 of FIG. 3 to use a particular error correcting code scheme. At block 815, configuration module 340 of FIG. 3 may configure RAID/Erasure Coding module 335 of FIG. 3 to use a particular Erasure Coding scheme. Blocks 805, 810, and 815 are all individually optional and may be omitted, as shown by dashed lines 820, 825, and 830.

Figure 9A:
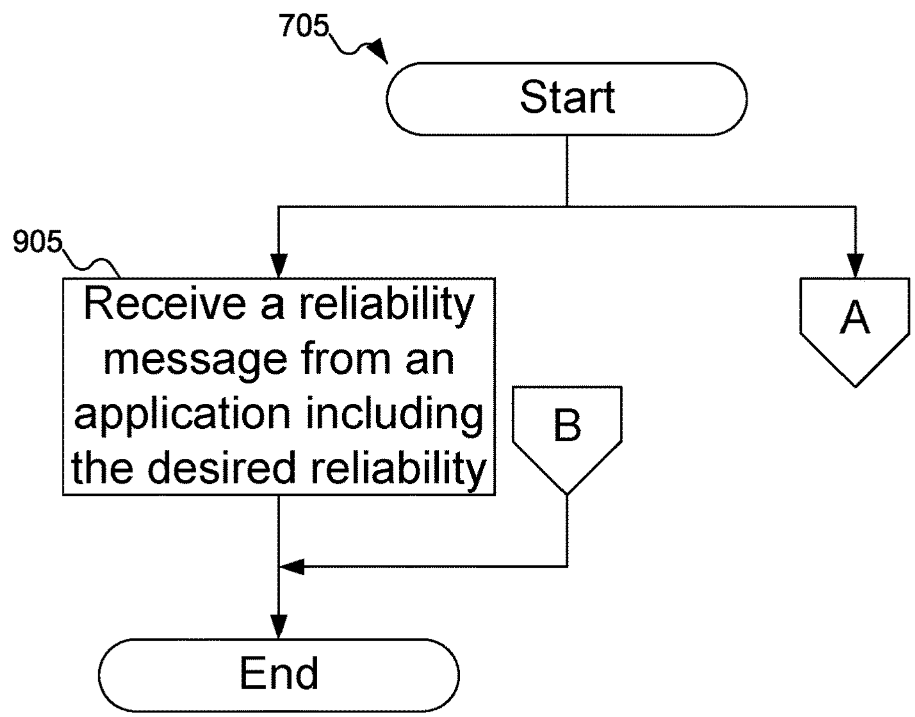
FIGS. 9A-9B show a flowchart of an example procedure for the SSD of FIG. 1 to determine a desired reliability.
Figure 9B:
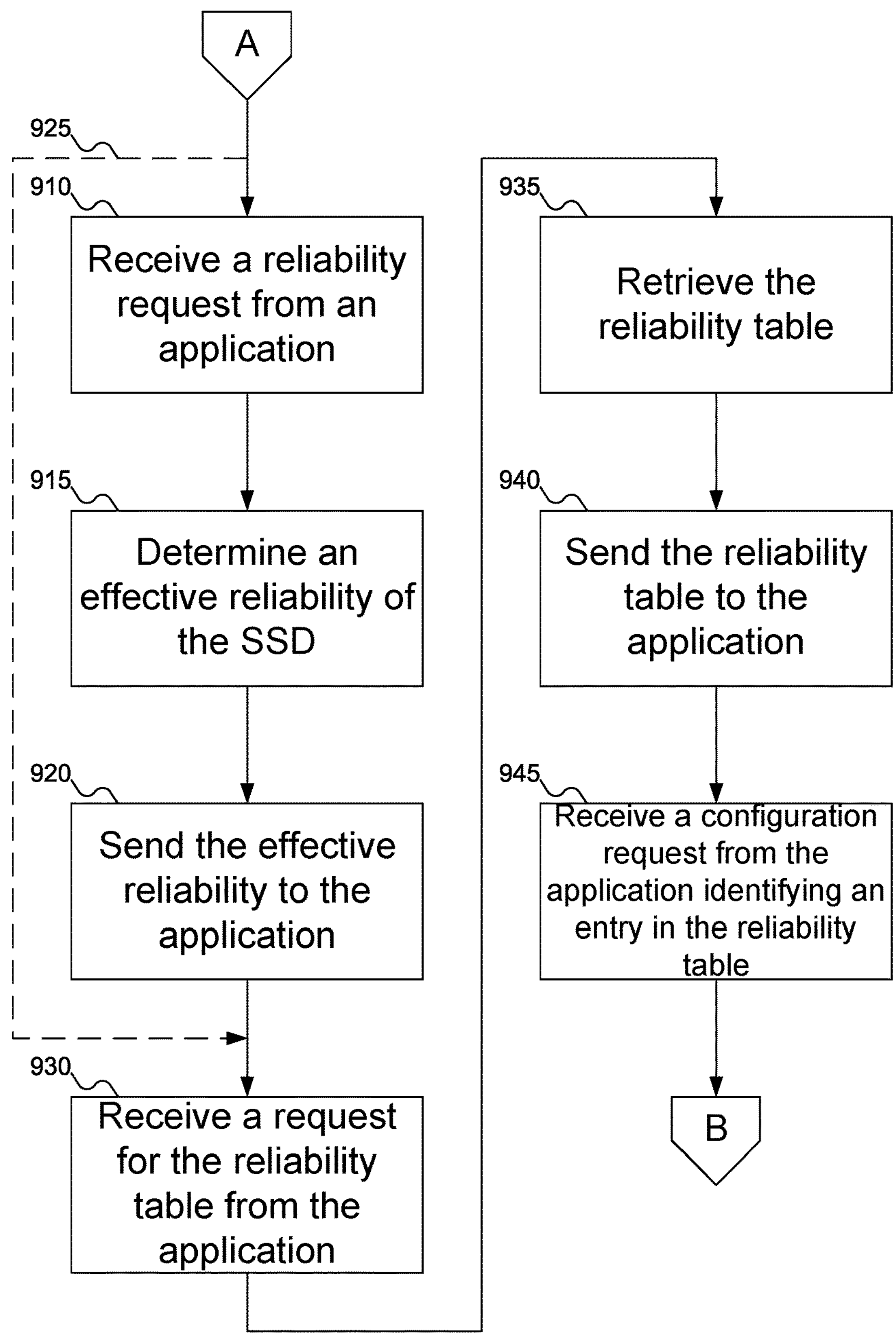

FIGS. 9A-9B show a flowchart of an example procedure for SSD 130 of FIG. 1 to determine a desired reliability. In FIG. 9A, at block 905, SSD 130 of FIG. 1 may receive reliability message 605 of FIG. 6, which may specify the desired reliability of SSD 130.

Alternatively, at block 910 (FIG. 9B), SSD 130 of FIG. 1 may receive reliability request 615 of FIG. 6 from application 505-1 of FIG. 5. At block 915, SSD 130 of FIG. 1 may determine the effective reliability of SSD 130 of FIG. 1. At block 920, SSD 130 may send the effective reliability to application 505-1 of FIG. 5 as message 620 of FIG. 6. Note that blocks 910, 915, and 920 are optional, as shown by dashed line 925.

At block 930, application 505-1 of FIG. 5 may send reliability table request 625 of FIG. 6. At block 935, SSD 130 of FIG. 1 may retrieve reliability table 405 of FIG. 4 from reliability table storage 345 of FIG. 3. At block 940, SSD 130 of FIG. 1 may send reliability table 405 of FIG. 4 to application 505-1 of FIG. 5 as message 630. Finally, at block 945, application 505-1 of FIG. 5 may send configuration request 635 to SSD 130 of FIG. 1, requesting that configuration module 340 of FIG. 3 configure SSD 130 of FIG. 1 according to an entry in reliability table 405 identified in configuration request 635 of FIG. 6.

Figure 10:
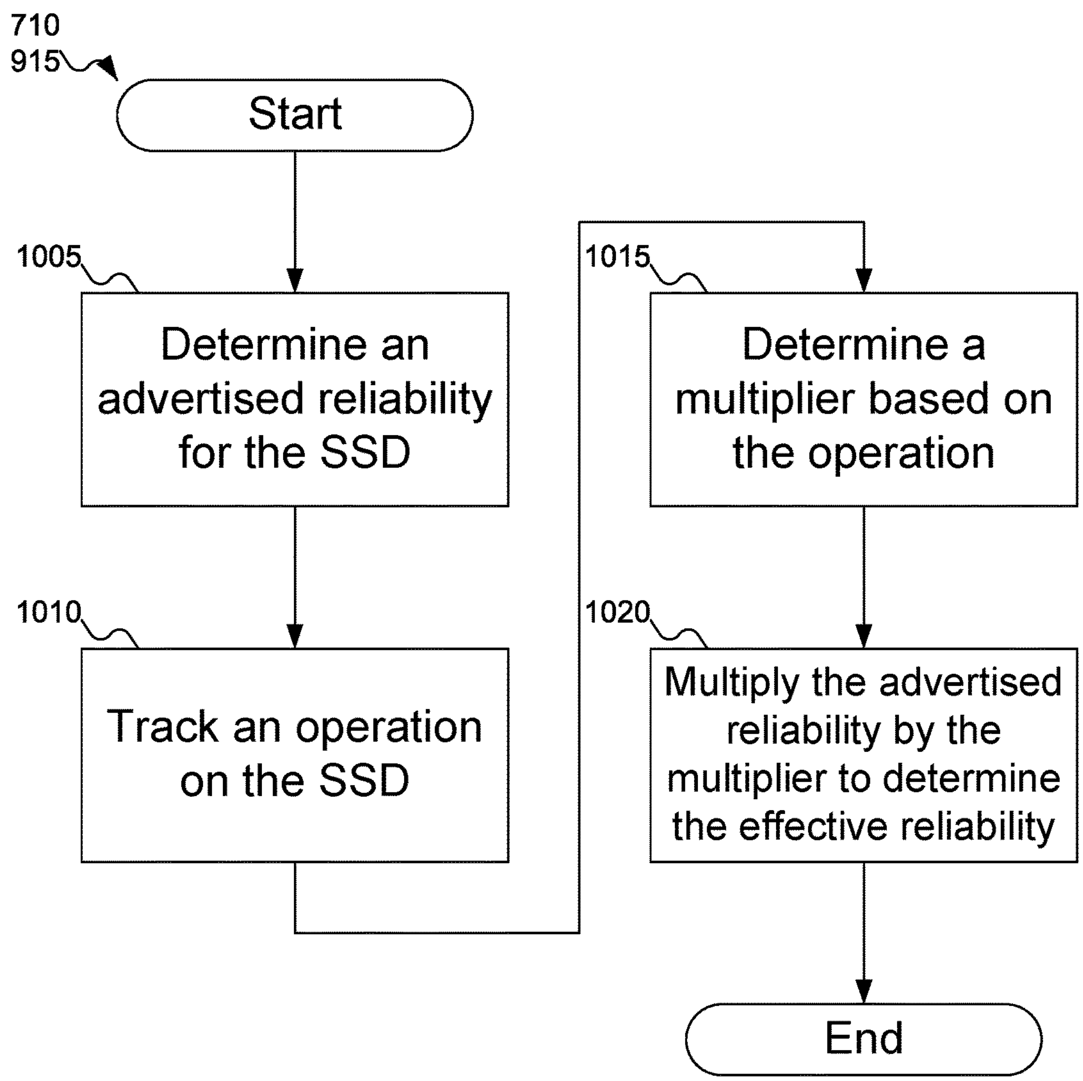
FIG. 10 shows a flowchart of an example procedure for the SSD of FIG. 1 to determine the effective reliability of the SSD of FIG. 1.

FIG. 10 shows a flowchart of an example procedure for SSD 130 of FIG. 1 to determine the effective reliability of SSD 130 of FIG. 1. In FIG. 10, at block 1005, SSD 130 of FIG. 1 may determine the advertised reliability of SSD 130 of FIG. 1 (at least, according to the current configuration of SSD 130 of FIG. 1). At block 1010, SSD 130 may track a current transaction requested by (or on behalf of) application 505-1 of FIG. 5. At block 1015, SSD 130 of FIG. 1 may determine a multiplier (or more than one multiplier) responsive to the current transactions (and previous transactions). Finally, at block 1020, SSD 130 of FIG. 1 may multiply the advertised reliability by the multiplier/multipliers to determine the effective reliability of SSD 130 of FIG. 1.

Figure 11A:
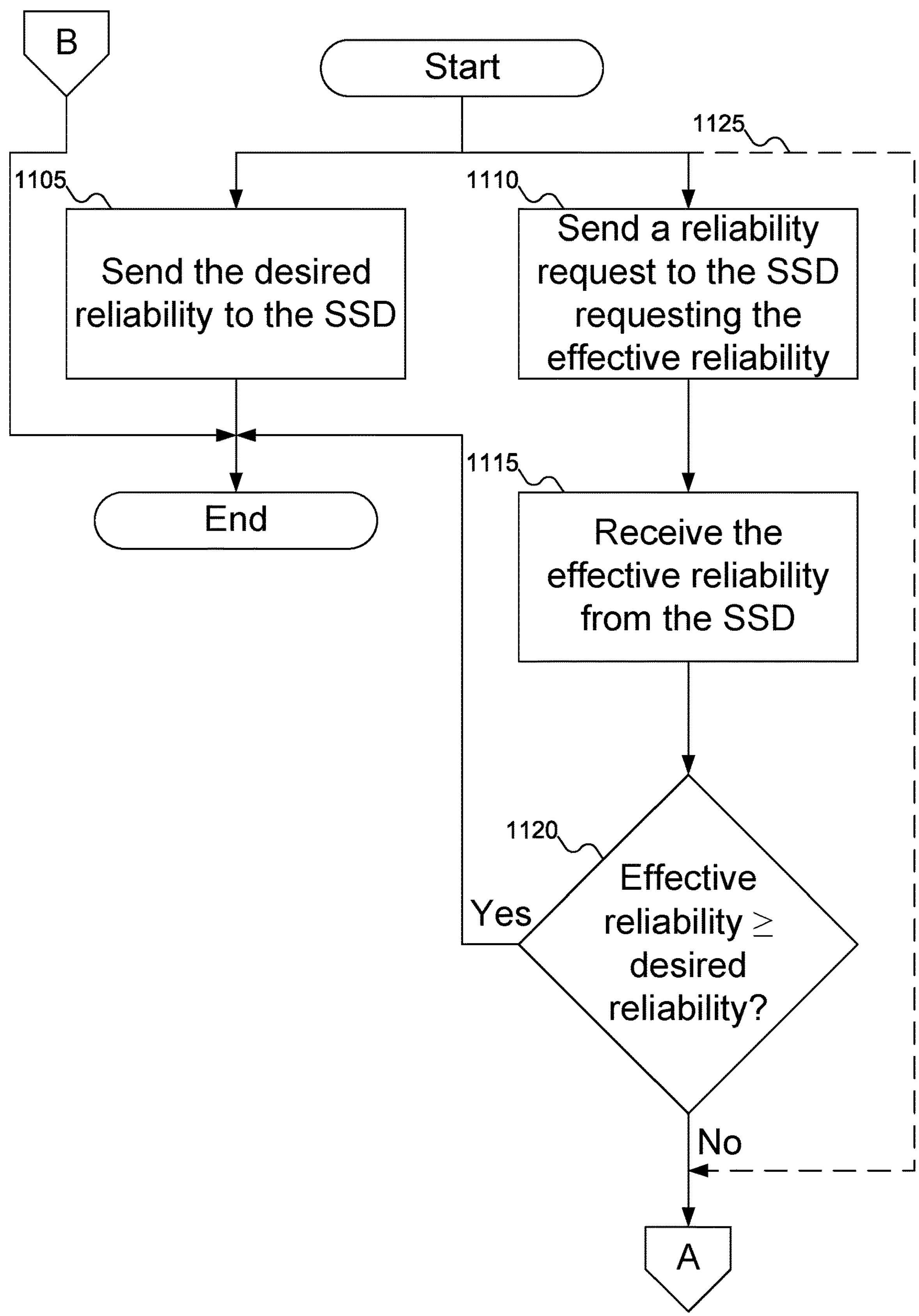
FIGS. 11A-11B show a flowchart of an example procedure for the application of FIG. 5 to instruct the SSD of FIG. 1 to provide a desired reliability, according to an embodiment of the inventive concept.
Figure 11B:
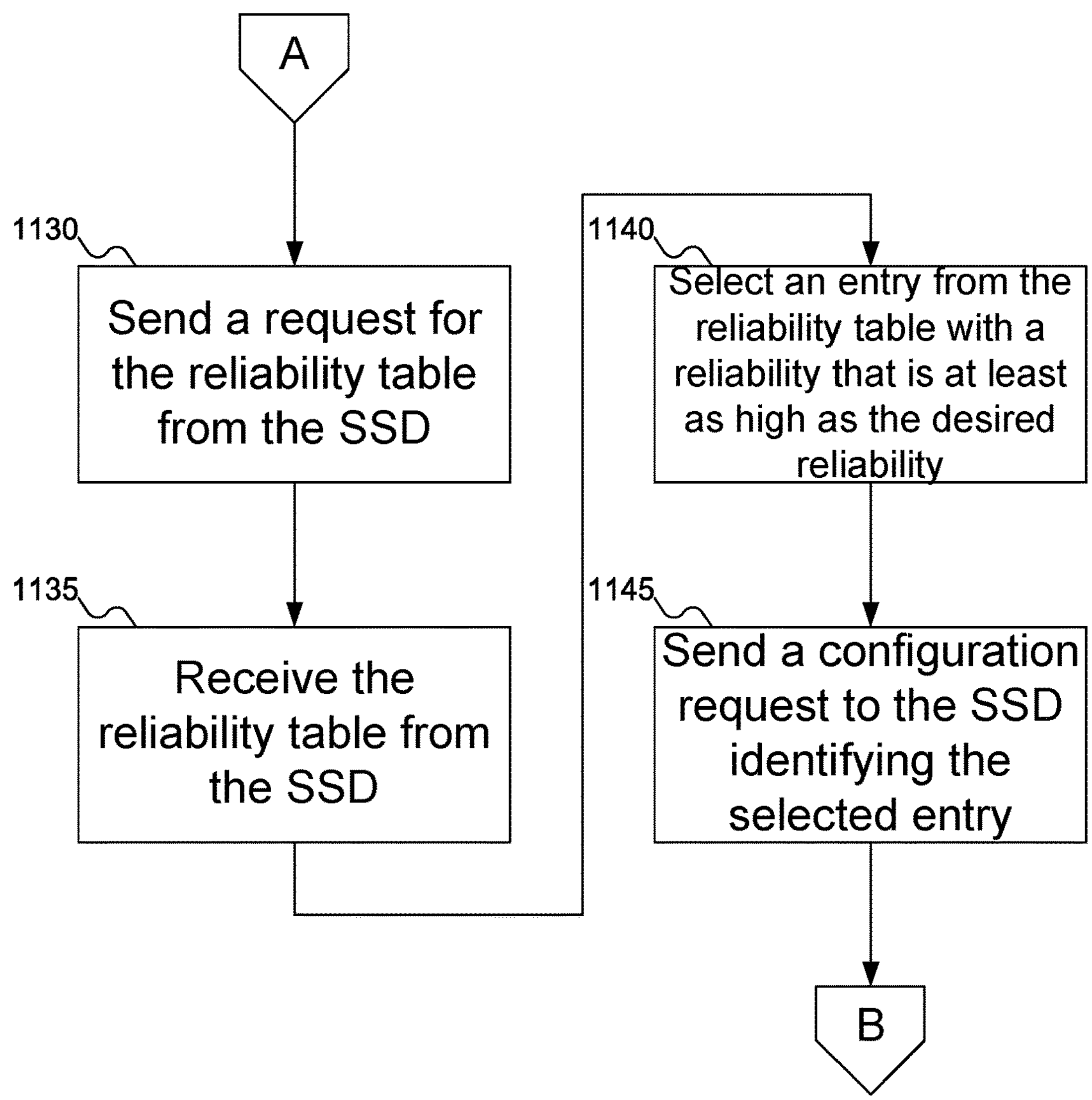

FIGS. 11A-11B show a flowchart of an example procedure for application 505-1 of FIG. 5 to instruct SSD 130 of FIG. 1 to provide a desired reliability, according to an embodiment of the inventive concept. In FIG. 11A, at block 1105, application 505-1 of FIG. 5 may simply send desired reliability 510-1 of FIG. 5 to SSD 130 of FIG. 1 (as reliability message 605 of FIG. 6). At this point, application 505-1 of FIG. 5 may be done, leaving it to SSD 130 of FIG. 1 to ensure desired reliability 510-1 of FIG. 5 is provided.

Alternatively, at block 1110, application 505-1 of FIG. 5 may send reliability request 615 of FIG. 6 to SSD 130 of FIG. 1. At block 1115, application 505-1 of FIG. 5 may receive the current effective reliability of SSD 130 of FIG. 1 in message 620 of FIG. 6. At block 1120, application 505-1 of FIG. 5 may compare the effective reliability of SSD 130 of FIG. 1 (as received in message 620 of FIG. 6) with desired reliability 510-1 of FIG. 5. If the effective reliability of SSD 130 of FIG. 1 is at least as high as desired reliability 510-1 of FIG. 5, then processing may end (as nothing need be done).

On the other hand, if the effective reliability of SSD 130 of FIG. 1 is less than desired reliability 510-1 of FIG. 5 (or if application 505-1 of FIG. 5 opts to request that SSD 130 of FIG. 1 be configured with a particular configuration regardless of its effective reliability, as shown by dashed arrow 1125), then at block 1130 (FIG. 11B), application 505-1 of FIG. 5 may send reliability table request 625 of FIG. 6 to SSD 130 of FIG. 1. At block 1135, SSD 130 of FIG. 1 may send reliability table 405 of FIG. 4 to application 505-1 of FIG. 5 as message 630. At block 1140, application 505-1 of FIG. 5 may select an entry in reliability table 405 of FIG. 4 that provides the desired reliability. Finally, at block 1145, application 505-1 of FIG. 5 may send configuration request 635 of FIG. 6, requesting that SSD 130 of FIG. 1 be configured according to the selected entry in reliability table 405 of FIG. 4.

In FIGS. 7-11B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. In conventional systems, the reliability of a storage device is set by the manufacturer and is basically outside the control of the user. Embodiments of the inventive concept not only give the customer some level of control over the reliability of the storage device but even permit automating such management. Applications may specify the desired reliability (or may specify a particular configuration of the storage device that implements a desired reliability). The storage device may then maintain that degree of reliability by changing the configuration as needed based on usage of the storage device.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:

an interface to receive read requests and write requests from a first application on a host;

storage for data, the storage including at least one chip;

an SSD controller to process the read requests and the write requests from the first application on the host using the storage;

a configuration module to configure the SSD; and storage for a reliability table, the reliability table including at least a first entry and a second entry, the first entry identifying a first configuration of the SSD and a first reliability for the first configuration of the SSD, and the second entry identifying a second configuration of the SSD and a second reliability for the second configuration of the SSD.

Statement 2. An embodiment of the inventive concept includes the SSD according to statement 1, wherein the interface may receive a configuration request from the first application on the host.

Statement 3. An embodiment of the inventive concept includes the SSD according to statement 2, wherein the configuration request includes an identifier of one of the first entry and the second entry in the reliability table.

Statement 4. An embodiment of the inventive concept includes the SSD according to statement 3, wherein the configuration module may reconfigure the SSD according to the identifier of one of the first entry and the second entry in the reliability table.

Statement 5. An embodiment of the inventive concept includes the SSD according to statement 1, wherein the interface may receive a reliability message from the first application on the host, the reliability message including a first desired reliability for the first application on the host.

Statement 6. An embodiment of the inventive concept includes the SSD according to statement 5, wherein the configuration module may configure the SSD according to one of the first entry and the second entry in the reliability table based on at least the first desired reliability.

Statement 7. An embodiment of the inventive concept includes the SSD according to statement 6, wherein the configuration module may configure the SSD according to one of the first entry and the second entry in the reliability table based on at least the first desired reliability for the first application on the host and a second desired reliability for a second application on the host.

Statement 8. An embodiment of the inventive concept includes the SSD according to statement 1, wherein the at least one chip offers at least a first storage scheme with a first chip reliability and a second storage scheme with a second chip reliability.

Statement 9. An embodiment of the inventive concept includes the SSD according to statement 8, wherein the first configuration of the SSD identifies the first storage scheme and the second configuration of the SSD identifies the second storage scheme.

Statement 10. An embodiment of the inventive concept includes the SSD according to statement 1, further comprising an Error Correcting Code (ECC) module, the ECC module offering at least a first ECC scheme with a first ECC reliability and a second ECC scheme with a second ECC reliability.

Statement 11. An embodiment of the inventive concept includes the SSD according to statement 10, wherein the first configuration of the SSD identifies the first ECC scheme and the second configuration of the SSD identifies the second ECC scheme.

Statement 12. An embodiment of the inventive concept includes the SSD according to statement 1, further comprising at least one of an Erasure Coding module or a Redundant Array of Independent Disks (RAID) module, the Erasure Coding module offering at least a first Erasure Coding scheme with a first Erasure Coding reliability and a second Erasure Coding scheme with a second Erasure Coding reliability and the RAID module offering at least a first RAID scheme with a first RAID reliability and a second RAID scheme with a second RAID reliability.

Statement 13. An embodiment of the inventive concept includes the SSD according to statement 12, wherein the first configuration of the SSD identifies at least one of the first Erasure Coding scheme or the first RAID scheme and the second configuration of the SSD identifies at least one of the second Erasure Coding scheme or the second RAID scheme.

Statement 14. An embodiment of the inventive concept includes the SSD according to statement 1, wherein the first entry in the reliability table identifies at least one of a first space overhead or a first performance for the first configuration of the SSD, and the second entry in the reliability table identifies at least one of a second space overhead or a second performance for the second configuration of the SSD.

Statement 15. An embodiment of the inventive concept includes the SSD according to statement 1, wherein the at least one chip includes at least one NAND flash chip.

Statement 16. An embodiment of the inventive concept includes a method, comprising:

determining a desired reliability for a Solid State Drive (SSD), the SSD including storage for data, the storage including at least one chip;

accessing a first entry in a reliability table from the SSD, the reliability table including at least the first entry and a second entry, the first entry identifying a first configuration of the SSD and a first reliability for the first configuration of the SSD, and the second entry identifying a second configuration of the SSD and a second reliability for the second configuration of the SSD; and configuring the SSD according to the first entry.

Statement 17. An embodiment of the inventive concept includes the method according to statement 16, wherein:

the first entry includes a first storage scheme for the chip;

the second entry includes a second storage scheme for the chip; and configuring the SSD according to the first entry includes configuring the chip according to the first storage scheme or the second storage scheme.

Statement 18. An embodiment of the inventive concept includes the method according to statement 16, wherein:

the SSD includes an Error Correcting Code (ECC) module;

the first entry includes a first ECC scheme for the ECC module;

the second entry includes a second storage scheme for the ECC module; and configuring the SSD according to the first entry includes configuring the ECC module according to the first ECC scheme or the second ECC scheme.

Statement 19. An embodiment of the inventive concept includes the method according to statement 16, wherein:

the SSD includes at least one of an Erasure Coding module or a Redundant Array of Independent Disks (RAID) module;

the first entry includes at least one of a first Erasure Coding scheme for the Erasure Coding module or a first RAID scheme for the RAID module;

the second entry includes at least one of a second Erasure Coding scheme for the Erasure Coding module or a second RAID scheme for the RAID module; and configuring the SSD according to the first entry includes configuring the at least one of the Erasure Coding module according to the first Erasure Coding scheme or the second Erasure Coding scheme or the RAID module according to the first RAID scheme or the second RAID scheme.

Statement 20. An embodiment of the inventive concept includes the method according to statement 16, wherein determining a desired reliability for a Solid State Drive (SSD) includes receiving the desired reliability at the SSD from an application on a host.

Statement 21. An embodiment of the inventive concept includes the method according to statement 20, wherein accessing a first entry in a reliability table from the SSD includes:

accessing the first entry and the second entry in the reliability table; and identifying that the first entry includes a reliability at least as high as the desired reliability.

Statement 22. An embodiment of the inventive concept includes the method according to statement 16, further comprising:

receiving from the application on the host at the SSD a reliability request for an effective reliability for the SSD;

determining the effective reliability for the SSD; and sending the effective reliability from the SSD to the application on the host.

Statement 23. An embodiment of the inventive concept includes the method according to statement 22, wherein determining the effective reliability for the SSD includes:

determining an advertised reliability for the SSD;

tracking an operation on the SSD;

determining a multiplier based on the operation on the SSD; and multiplying the advertised reliability by the multiplier to determine the effective reliability.

Statement 24. An embodiment of the inventive concept includes the method according to statement 16, wherein accessing a first entry in a reliability table from the SSD includes receiving an identifier of the first entry in the reliability table from the application on the host at the SSD.

Statement 25. An embodiment of the inventive concept includes the method according to statement 24, wherein sending the effective reliability from the SSD to the application on the host includes sending the first entry and the second entry in the reliability table to the application on the host from the SSD.

Statement 26. An embodiment of the inventive concept includes the method according to statement 16, wherein:

the first entry in the reliability table identifies at least one of a first space overhead or a first performance for the first configuration of the SSD;

the second entry in the reliability table identifies at least one of a second space overhead or a second performance for the second configuration of the SSD; and accessing a first entry in a reliability table from the SSD includes accessing the first entry in the reliability table from the SSD based on at least the desired reliability and at least one of a desired space overhead or a desired performance.

Statement 27. An embodiment of the inventive concept includes the method according to statement 16, wherein the at least one chip includes at least one NAND flash chip.

Statement 28. An embodiment of the inventive concept includes a method, comprising:

sending a reliability request from an application on a host to an SSD, the reliability request requesting an effective reliability for the SSD;

receiving the effective reliability for the SSD from the SSD at the application on the host;

sending a reliability table request from the application on the host to the SSD, the reliability table request requesting a reliability table stored on the SSD;

receiving the reliability table from the SSD at the application on the host, each entry in the reliability table identifying a configuration of the SSD and a reliability for the configuration of the SSD;

selecting an entry in the reliability table based on at least a desired reliability for the application on the host; and sending a configuration request to the SSD from the application on the host, the configuration request identifying the entry in the reliability table.

Statement 29. An embodiment of the inventive concept includes the method according to statement 28, further comprising:

comparing the effective reliability for the SSD with a desired reliability for the application on the host; and based on at least the effective reliability for the SSD exceeding the desired reliability for the application on the host, not sending the configuration request to the SSD.

Statement 30. An embodiment of the inventive concept includes the method according to statement 28, wherein selecting an entry in the reliability table based on at least a desired reliability for the application on the host includes selecting the entry in the reliability table for which the reliability for the configuration of the SSD is at least as high as the desired reliability.

Statement 31. An embodiment of the inventive concept includes the method according to statement 28, wherein:

each entry in the reliability table further identifies at least one of a first space overhead or a first performance for the configuration of the SSD;

the second entry in the reliability table identifies at least one of a second space overhead or a second performance; and selecting an entry in the reliability table based on at least a desired reliability for the application on the host includes selecting the entry in the reliability table based on at least the desired reliability for the application on the host and at least one of a desired space overhead or a desired performance.

Statement 32. An embodiment of the inventive concept includes an article, comprising a non-transitory storage medium, the non-transitory storage medium having stored thereon instructions that, when executed by a machine, result in:

determining a desired reliability for a Solid State Drive (SSD), the SSD including storage for data, the storage including at least one chip;

accessing a first entry in a reliability table from the SSD, the reliability table including at least the first entry and a second entry, the first entry identifying a first configuration of the SSD and a first reliability for the first configuration of the SSD, and the second entry identifying a second configuration of the SSD and a second reliability for the second configuration of the SSD; and configuring the SSD according to the first entry.

Statement 33. An embodiment of the inventive concept includes the article according to statement 32, wherein:

the first entry includes a first storage scheme for the chip;

the second entry includes a second storage scheme for the chip; and configuring the SSD according to the first entry includes configuring the chip according to the first storage scheme or the second storage scheme.

Statement 34. An embodiment of the inventive concept includes the article according to statement 32, wherein:

the SSD includes an Error Correcting Code (ECC) module;

the first entry includes a first ECC scheme for the ECC module;

the second entry includes a second storage scheme for the ECC module; and configuring the SSD according to the first entry includes configuring the ECC module according to the first ECC scheme or the second ECC scheme.

Statement 35. An embodiment of the inventive concept includes the article according to statement 32, wherein:

the SSD includes at least one of an Erasure Coding module or a Redundant Array of Independent Disks (RAID) module;

the first entry includes at least one of a first Erasure Coding scheme for the Erasure Coding module or a first RAID scheme for the RAID module;

the second entry includes at least one of a second Erasure Coding scheme for the Erasure Coding module or a second RAID scheme for the RAID module; and configuring the SSD according to the first entry includes configuring the at least one of the Erasure Coding module according to the first Erasure Coding scheme or the second Erasure Coding scheme or the RAID module according to the first RAID scheme or the second RAID scheme.

Statement 36. An embodiment of the inventive concept includes the article according to statement 32, wherein determining a desired reliability for a Solid State Drive (SSD) includes receiving the desired reliability at the SSD from an application on a host.

Statement 37. An embodiment of the inventive concept includes the article according to statement 36, wherein accessing a first entry in a reliability table from the SSD includes:

accessing the first entry and the second entry in the reliability table; and identifying that the first entry includes a reliability at least as high as the desired reliability.

Statement 38. An embodiment of the inventive concept includes the article according to statement 32, the non-transitory storage medium having stored thereon further instructions that, when executed by the machine, result in:

receiving from the application on the host at the SSD a reliability request for an effective reliability for the SSD;

determining the effective reliability for the SSD; and sending the effective reliability from the SSD to the application on the host.

Statement 39. An embodiment of the inventive concept includes the article according to statement 38, wherein determining the effective reliability for the SSD includes:

determining an advertised reliability for the SSD;

tracking an operation on the SSD;

determining a multiplier based on the operation on the SSD; and multiplying the advertised reliability by the multiplier to determine the effective reliability.

Statement 40. An embodiment of the inventive concept includes the article according to statement 38, wherein accessing a first entry in a reliability table from the SSD includes receiving an identifier of the first entry in the reliability table from the application on the host at the SSD.

Statement 41. An embodiment of the inventive concept includes the article according to statement 40, wherein sending the effective reliability from the SSD to the application on the host includes sending the first entry and the second entry in the reliability table to the application on the host from the SSD.

Statement 42. An embodiment of the inventive concept includes the article according to statement 32, wherein:

the first entry in the reliability table identifies at least one of a first space overhead or a first performance for the first configuration of the SSD;

the second entry in the reliability table identifies at least one of a second space overhead or a second performance for the second configuration of the SSD; and accessing a first entry in a reliability table from the SSD includes accessing the first entry in the reliability table from the SSD based on at least the desired reliability and at least one of a desired space overhead or a desired performance.

Statement 43. An embodiment of the inventive concept includes the article according to statement 32, wherein the at least one chip includes at least one NAND flash chip.

Statement 44. An embodiment of the inventive concept includes an article, comprising:

sending a reliability request from an application on a host to an SSD, the reliability request requesting an effective reliability for the SSD;

receiving the effective reliability for the SSD from the SSD at the application on the host;

sending a reliability table request from the application on the host to the SSD, the reliability table request requesting a reliability table stored on the SSD;

receiving the reliability table from the SSD at the application on the host, each entry in the reliability table identifying a configuration of the SSD and a reliability for the configuration of the SSD;

selecting an entry in the reliability table based on at least a desired reliability for the application on the host; and sending a configuration request to the SSD from the application on the host, the configuration request identifying the entry in the reliability table.

Statement 45. An embodiment of the inventive concept includes the article according to statement 44, the non-transitory storage medium having stored thereon further instructions that, when executed by the machine, result in:

comparing the effective reliability for the SSD with a desired reliability for the application on the host; and based on at least the effective reliability for the SSD exceeding the desired reliability for the application on the host, not sending the configuration request to the SSD.

Statement 46. An embodiment of the inventive concept includes the article according to statement 44, wherein selecting an entry in the reliability table based on at least a desired reliability for the application on the host includes selecting the entry in the reliability table for which the reliability for the configuration of the SSD is at least as high as the desired reliability.

Statement 47. An embodiment of the inventive concept includes the article according to statement 44, wherein:

each entry in the reliability table further identifies at least one of a first space overhead or a first performance for the configuration of the SSD;

the second entry in the reliability table identifies at least one of a second space overhead or a second performance; and selecting an entry in the reliability table based on at least a desired reliability for the application on the host includes selecting the entry in the reliability table based on at least the desired reliability for the application on the host and at least one of a desired space overhead or a desired performance.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:

an interface to receive a request from a first application on a host;

a first storage for data;

a controller to process the request from the first application on the host using the storage;

a configuration module to configure the storage device; and a second storage for a data structure, the data structure including at least a first entry and a second entry, the first entry identifying a first configuration of the storage device and a first performance parameter for the first configuration of the storage device, and the second entry identifying a second configuration of the storage device and a second performance parameter for the second configuration of the storage device.

2. The storage device according to claim 1, wherein:

the first performance parameter includes a first reliability; and the second performance parameter includes a second reliability.

3. The storage device according to claim 2, wherein the interface may receive a configuration request from the first application on the host.

4. The storage device according to claim 3, wherein the configuration request includes an identifier of one of the first entry and the second entry in the data structure.

5. The storage device according to claim 2, wherein the interface may receive a reliability message from the first application on the host, the reliability message including a third reliability for the first application on the host.

6. The storage device according to claim 5, wherein the configuration module may configure the storage device according to one of the first entry and the second entry in the data structure based on at least the third reliability.

7. The storage device according to claim 2, wherein the at least one storage offers at least a first storage scheme with a third reliability and a second storage scheme with a fourth reliability.

8. The storage device according to claim 7, wherein the first configuration of the storage device identifies the first storage scheme and the second configuration of the storage device identifies the second storage scheme.

9. The storage device according to claim 2, further comprising an Error Correcting Code (ECC) module, the ECC module offering at least a first ECC scheme with a third reliability and a second ECC scheme with a fourth reliability.

10. The storage device according to claim 9, wherein the first configuration of the storage device identifies the first ECC scheme and the second configuration of the storage device identifies the second ECC scheme.

11. The storage device according to claim 2, further comprising at least one of an Erasure Coding module or a RAID module, the Erasure Coding module offering at least a first Erasure Coding scheme with a third reliability or a second Erasure Coding scheme with a fourth reliability and the RAID module offering at least a first RAID scheme with a fifth reliability or a second RAID scheme with a sixth reliability.

12. The storage device according to claim 11, wherein the first configuration of the storage device identifies at least one of the first Erasure Coding scheme or the first RAID scheme and the second configuration of the storage device identifies at least one of the second Erasure Coding scheme or the second RAID scheme.

13. A method, comprising:

determining a first performance parameter for a storage device, the storage device including storage for data, the storage device including a second performance parameter;

accessing a first entry in a data structure from the storage device, the data structure including at least the first entry and a second entry, the first entry identifying a first configuration of the storage device and a third performance parameter for the first configuration of the storage device, and the second entry identifying a second configuration of the storage device and a fourth performance parameter for the second configuration of the storage device, the third performance parameter satisfying the first performance parameter; and configuring the storage device according to the first entry, wherein the first performance parameter is greater than the second performance parameter for the storage device.

14. The method according to claim 13, wherein:

the first performance parameter includes a first reliability;

the second performance parameter includes a second reliability;

the third performance parameter includes a third reliability; and the fourth performance parameter includes a fourth reliability.

15. The method according to claim 14, wherein:

the first entry includes a first storage scheme for the storage;

the second entry includes a second storage scheme for the storage; and configuring the storage device according to the first entry includes configuring the storage according to the first storage scheme or the second storage scheme.

16. The method according to claim 14, wherein:

the storage device includes an Error Correcting Code (ECC) module;

the first entry includes a first ECC scheme for the ECC module;

the second entry includes a second storage scheme for the ECC module; and configuring the storage device according to the first entry includes configuring the ECC module according to the first ECC scheme or the second ECC scheme.

17. The method according to claim 14, wherein:

the storage device includes at least one of an Erasure Coding module or a RAID module;

the first entry includes at least one of a first Erasure Coding scheme for the Erasure Coding module or a first RAID scheme for the RAID module;

the second entry includes at least one of a second Erasure Coding scheme for the Erasure Coding module or a second RAID scheme for the RAID module; and configuring the storage device according to the first entry includes configuring the at least one of the Erasure Coding module according to the first Erasure Coding scheme or the second Erasure Coding scheme or the RAID module according to the first RAID scheme or the second RAID scheme.

18. The method according to claim 14, wherein determining a first reliability for a storage device includes receiving the first reliability at the storage device from an application on a host.

19. The method according to claim 18, wherein accessing the first entry in the data structure from the storage device includes:

accessing the first entry and the second entry in the data structure; and identifying that the first entry the third reliability is at least as high as the first reliability.

20. The method according to claim 14, wherein accessing the first entry in the data structure from the storage device includes receiving an identifier of the first entry in the data structure from the application on the host at the storage device.

21. A method, comprising:

sending a request from an application on a host to a storage device, the request requesting a first performance parameter for the storage device;

receiving the first performance parameter for the storage device from the storage device at the application on the host;

selecting an entry in a data structure based on at least a second performance parameter for the application on the host; and sending a configuration request to the storage device from the application on the host, the configuration request identifying the entry in the data structure.

22. The method according to claim 21, wherein:

the first performance parameter includes a first reliability; and the second performance parameter includes a second reliability.

23. The method according to claim 22, wherein selecting the entry in the data structure based on at least the second reliability for the application on the host includes selecting the entry in the data structure for which a third reliability for the configuration of the storage device is at least as high as the second reliability.

* * * * *